US011128811B2

(12) United States Patent
Ikeda et al.

(10) Patent No.: US 11,128,811 B2
(45) Date of Patent: Sep. 21, 2021

(54) INFORMATION PROCESSING APPARATUS AND INFORMATION PROCESSING METHOD

(71) Applicant: SONY CORPORATION, Tokyo (JP)

(72) Inventors: Hiroshi Ikeda, Kanagawa (JP); Nobuho Ikeda, Kanagawa (JP); Seijiro Inaba, Kanagawa (JP); Kazuhiro Shimauchi, Kanagawa (JP); Yuki Ono, Kanagawa (JP); Shuichi Asajima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/320,775

(22) PCT Filed: Jun. 5, 2015

(86) PCT No.: PCT/JP2015/002846
§ 371 (c)(1),
(2) Date: Dec. 21, 2016

(87) PCT Pub. No.: WO2016/002134
PCT Pub. Date: Jan. 7, 2016

(65) Prior Publication Data
US 2017/0142341 A1    May 18, 2017

(30) Foreign Application Priority Data

Jul. 3, 2014   (JP) .............................. JP2014-137930

(51) Int. Cl.
*H04N 5/247* (2006.01)
*G11B 27/031* (2006.01)
*G06K 9/00* (2006.01)

(52) U.S. Cl.
CPC ......... *H04N 5/247* (2013.01); *G06K 9/00771* (2013.01); *G11B 27/031* (2013.01)

(58) Field of Classification Search
CPC ... H04N 5/247; G06K 9/00771; G11B 27/031
(Continued)

(56) References Cited

U.S. PATENT DOCUMENTS

2004/0130501 A1* 7/2004 Kondo ................ G06F 3/04815
345/1.1
2005/0273830 A1* 12/2005 Silver .................. H04N 5/4401
725/105

(Continued)

FOREIGN PATENT DOCUMENTS

CN      103813124 A    5/2014
EP      1489847 A2    12/2004

(Continued)

OTHER PUBLICATIONS

Office Action for CN Patent Application No. 202010149644.2, dated Jul. 13, 2021, 04 pages of Office Action and 02 pages of English Translation.

*Primary Examiner* — Farzana Hossain
(74) *Attorney, Agent, or Firm* — Chip Law Group

(57) ABSTRACT

An information processing apparatus including circuitry that connects a reference image and a target image with at least one of a plurality of complement images based on a reference viewpoint of a subject and a target viewpoint of the subject in response to an identification of the target viewpoint. Each of the plurality of complement images corresponds to a complementary viewpoint of the subject between the reference viewpoint and the target viewpoint. At least one of the plurality of complement images is an interpolation image, which is an image corresponding to a virtual viewpoint along the virtual path.

16 Claims, 20 Drawing Sheets

(58) Field of Classification Search
USPC .................................. 348/143, 153, 157, 159
See application file for complete search history.

(56) References Cited

U.S. PATENT DOCUMENTS

| | | | |
|---|---|---|---|
| 2006/0066612 A1* | 3/2006 | Yang ..................... | G06T 15/205 |
| | | | 345/419 |
| 2009/0297119 A1 | 12/2009 | Takamori et al. | |
| 2010/0115411 A1* | 5/2010 | Sorokin ................. | G03B 37/04 |
| | | | 715/723 |
| 2010/0157020 A1* | 6/2010 | Choi ..................... | H04N 5/232 |
| | | | 348/47 |
| 2015/0015660 A1* | 1/2015 | Weber .................... | G03B 37/04 |
| | | | 348/14.03 |

FOREIGN PATENT DOCUMENTS

| | | |
|---|---|---|
| FR | 2834416 A1 | 7/2003 |
| JP | 2009290391 A | 12/2009 |
| JP | 2012-004739 A | 1/2012 |

\* cited by examiner

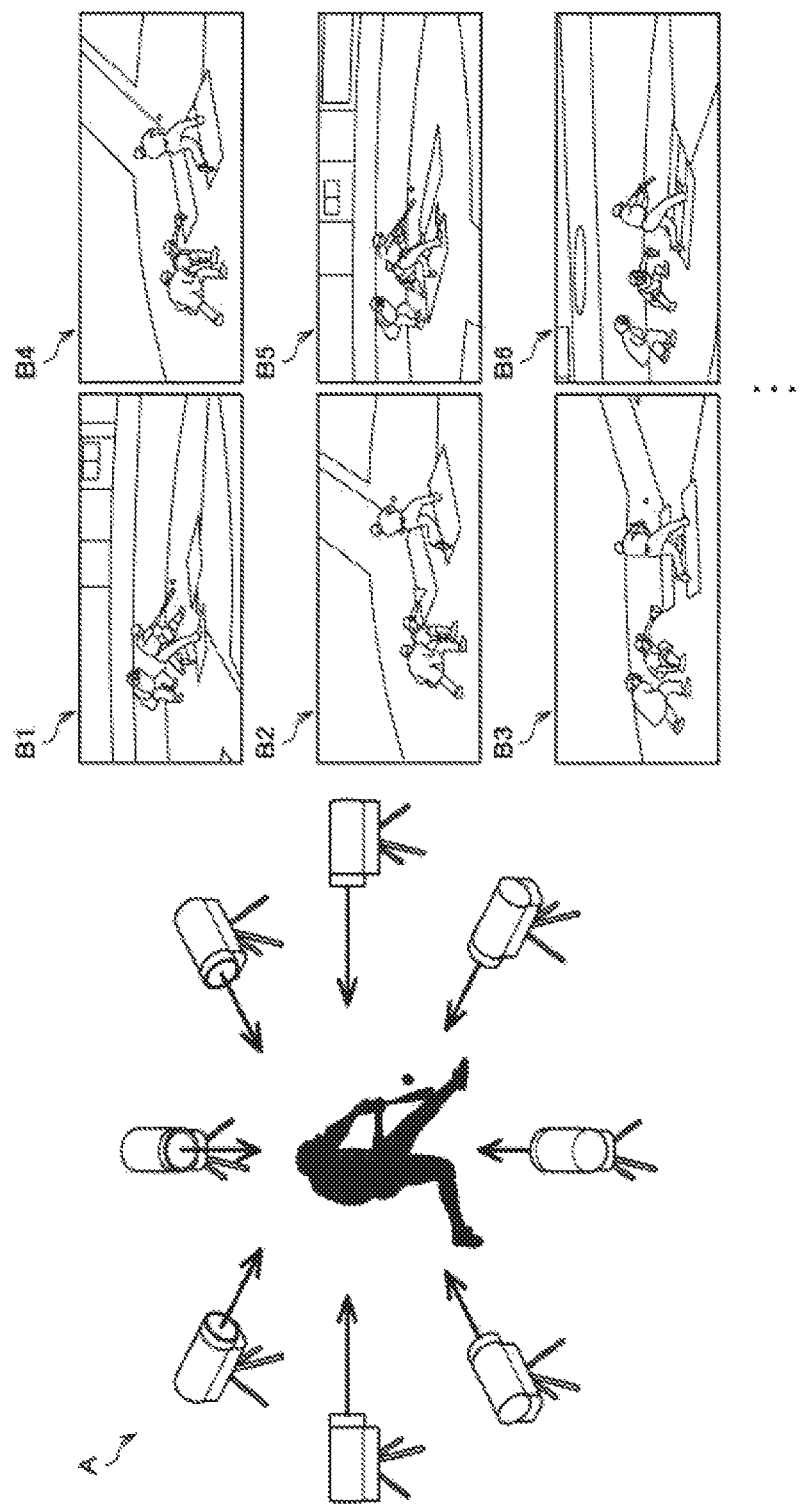

[Fig. 2]
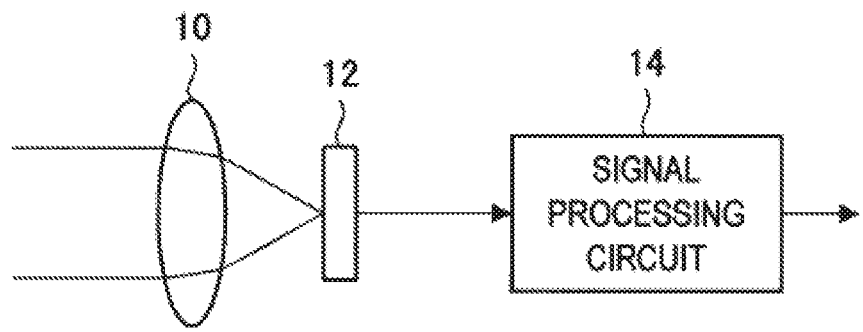

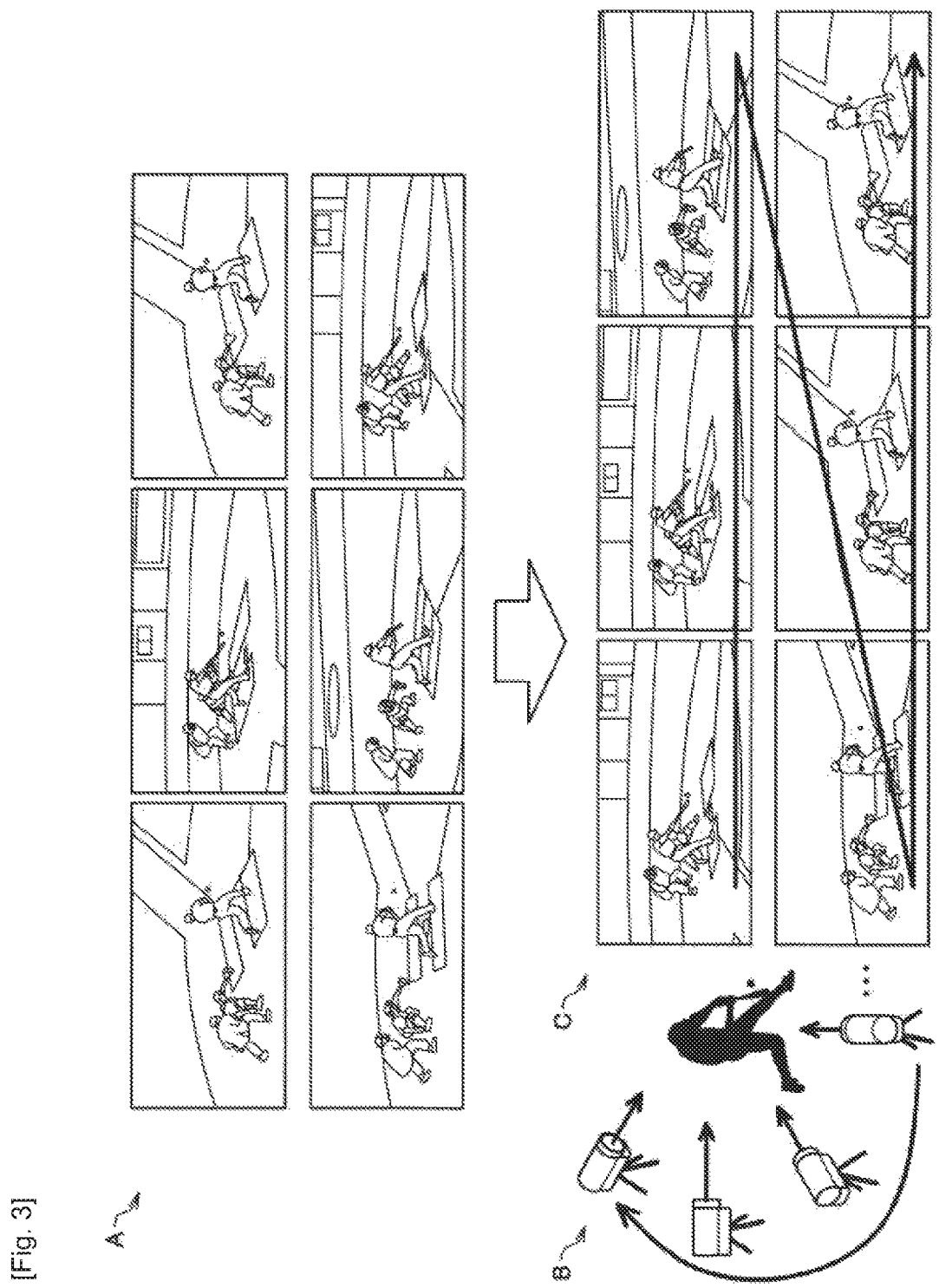
[Fig. 3]

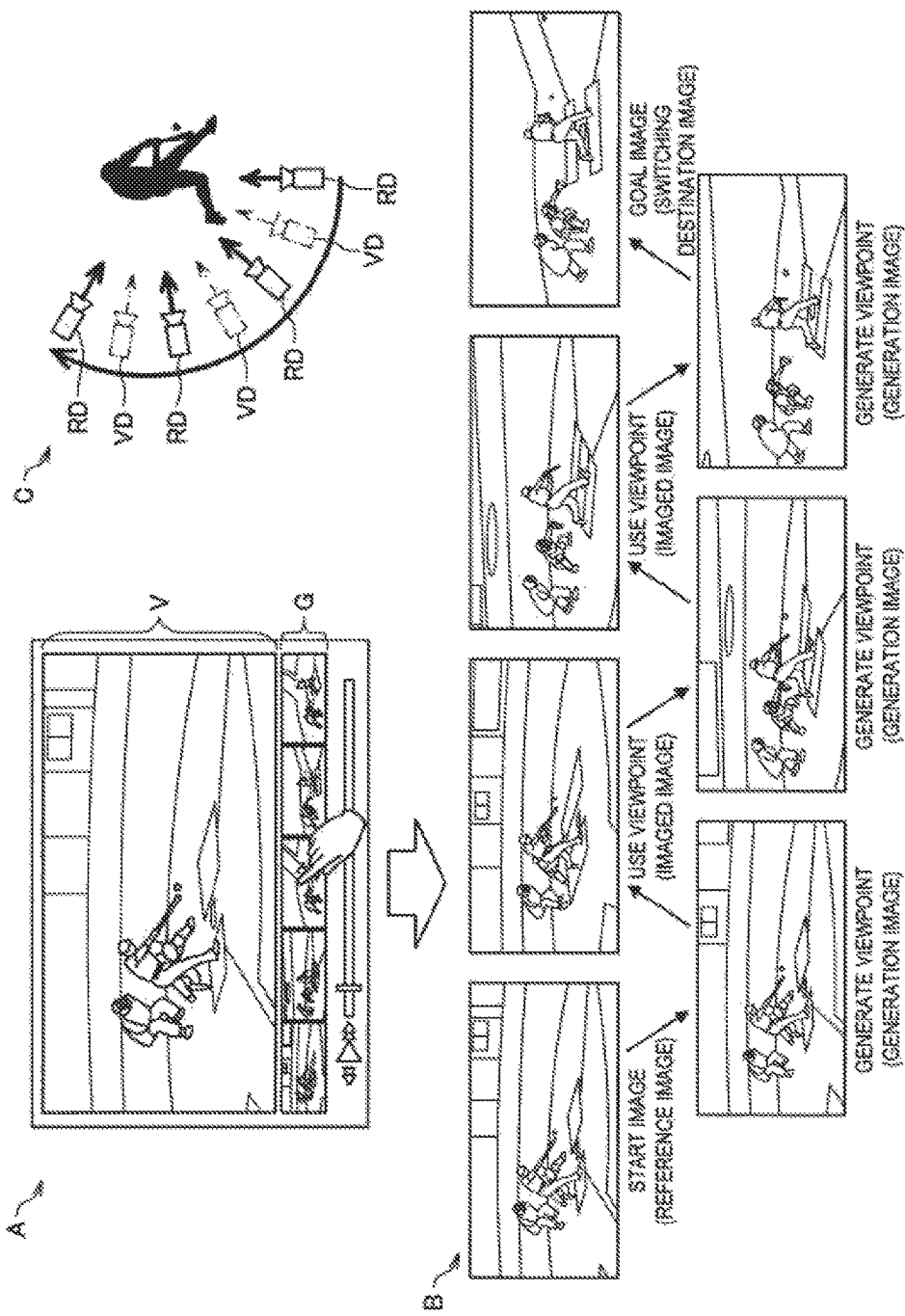

[Fig. 5A]
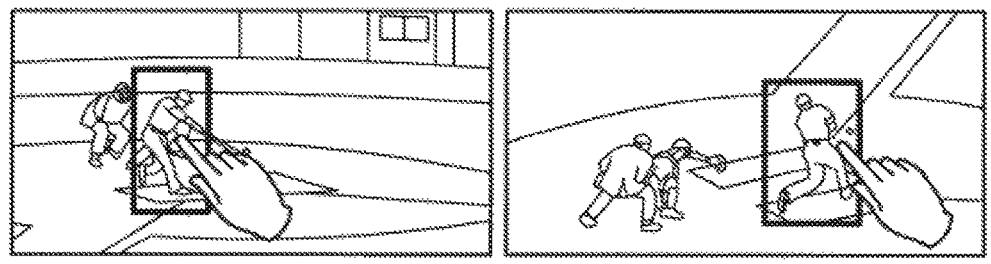
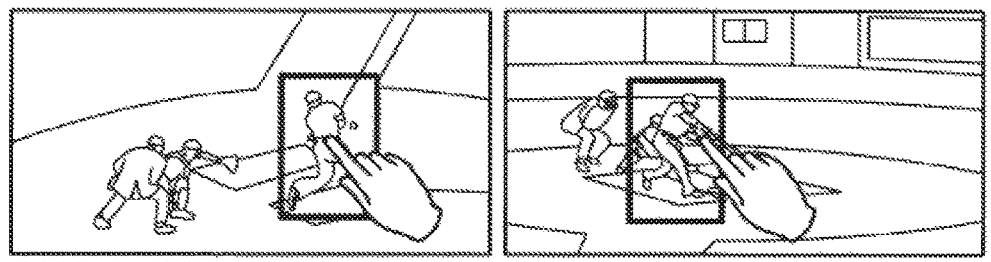
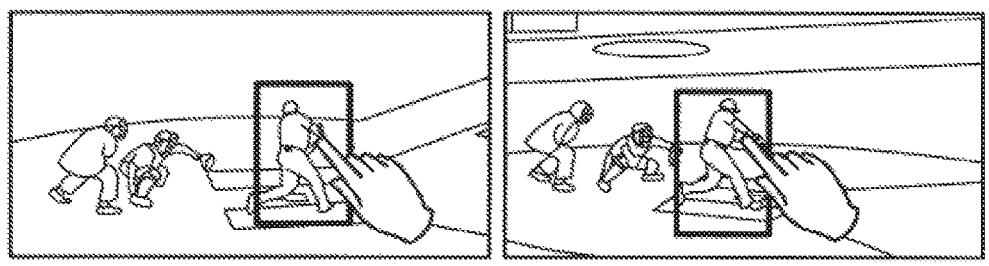

[Fig. 5B]
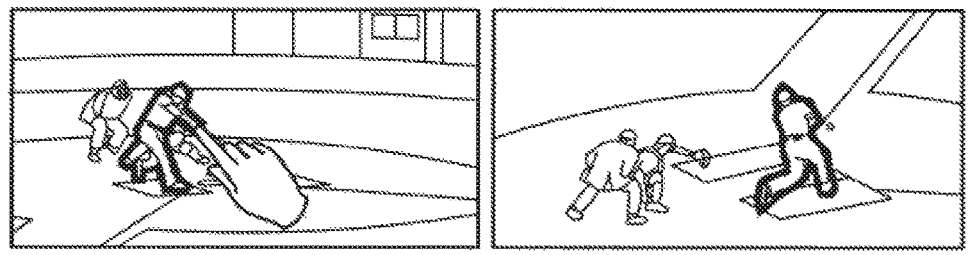
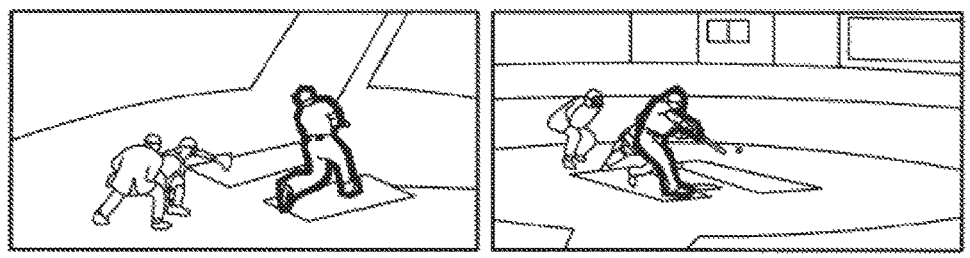
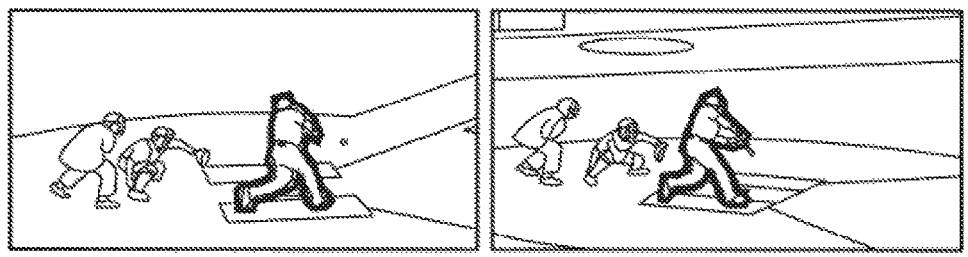

[Fig. 5C]
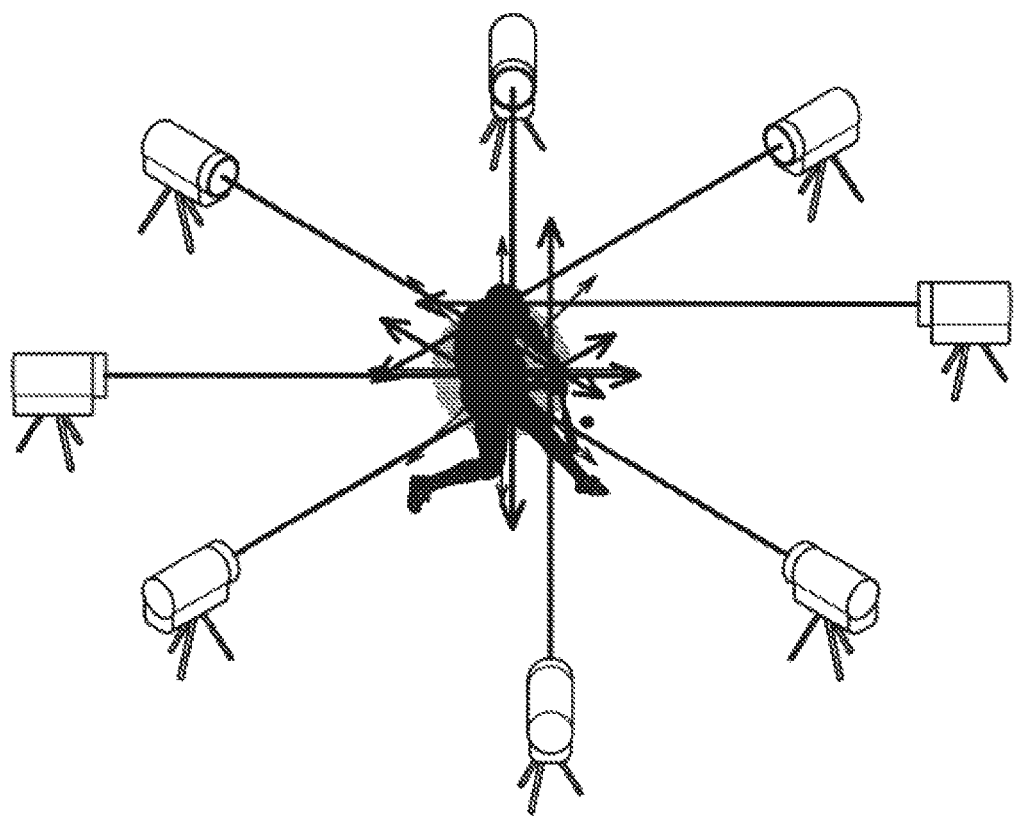

[Fig. 6]
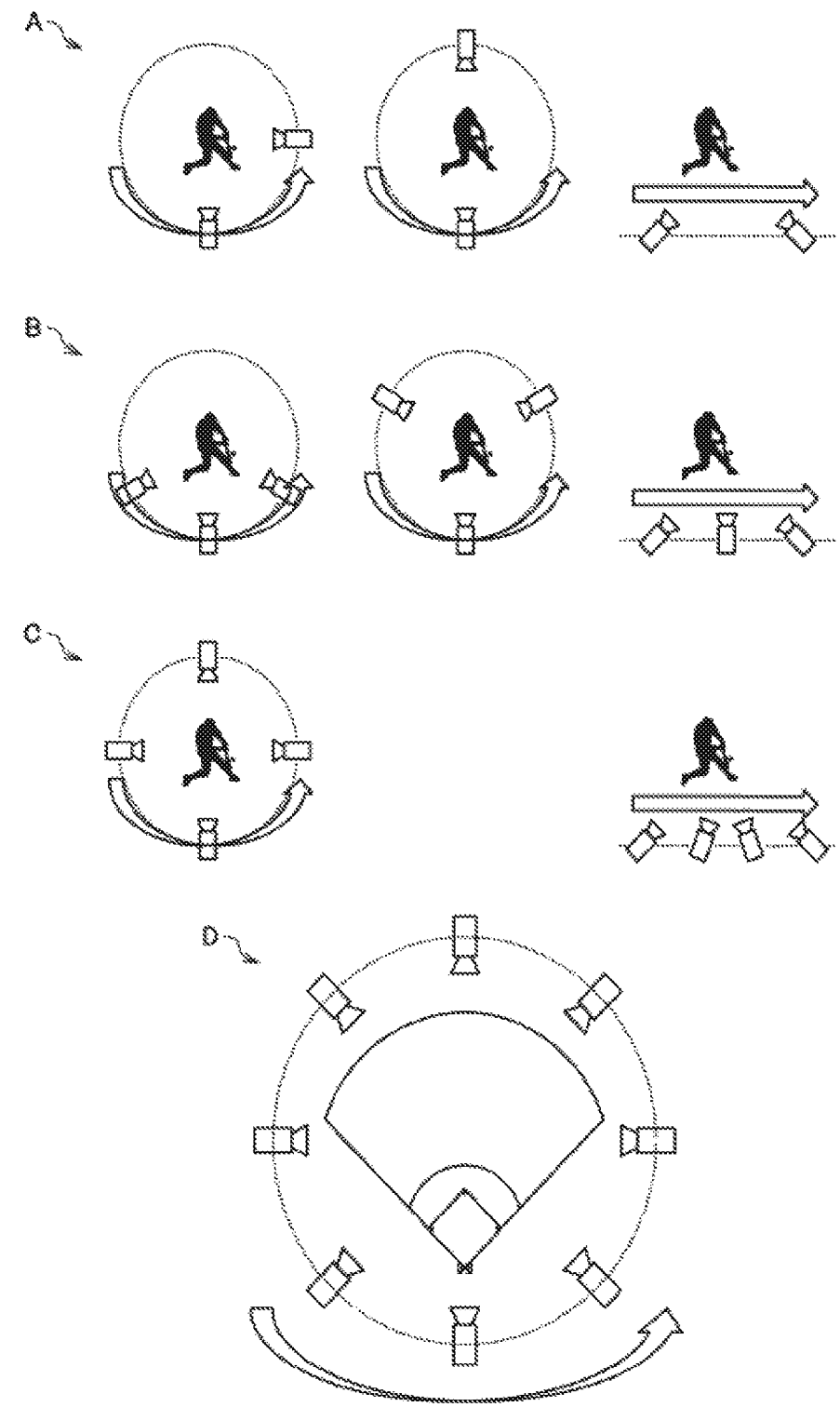

[Fig. 7]
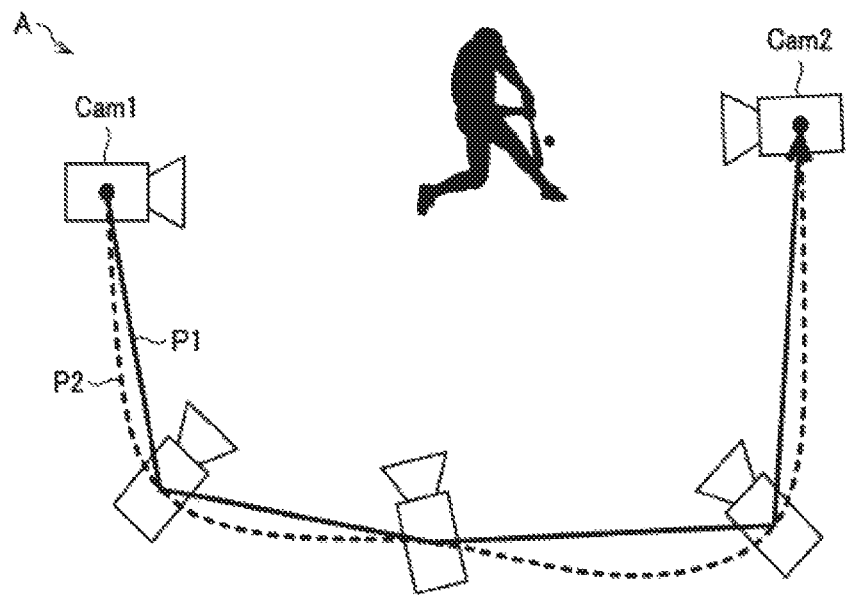
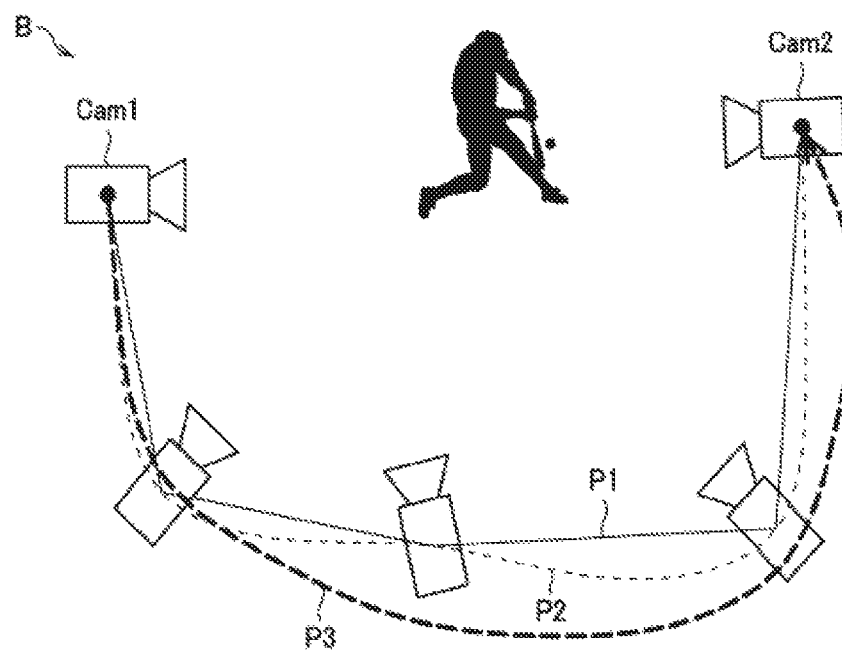

[Fig. 8A]
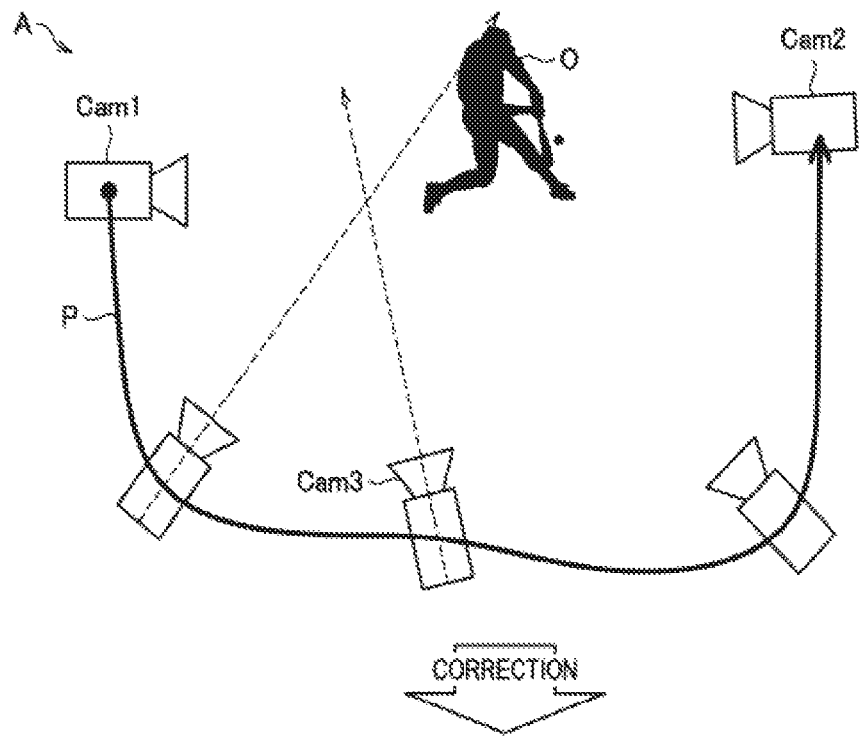
CORRECTION
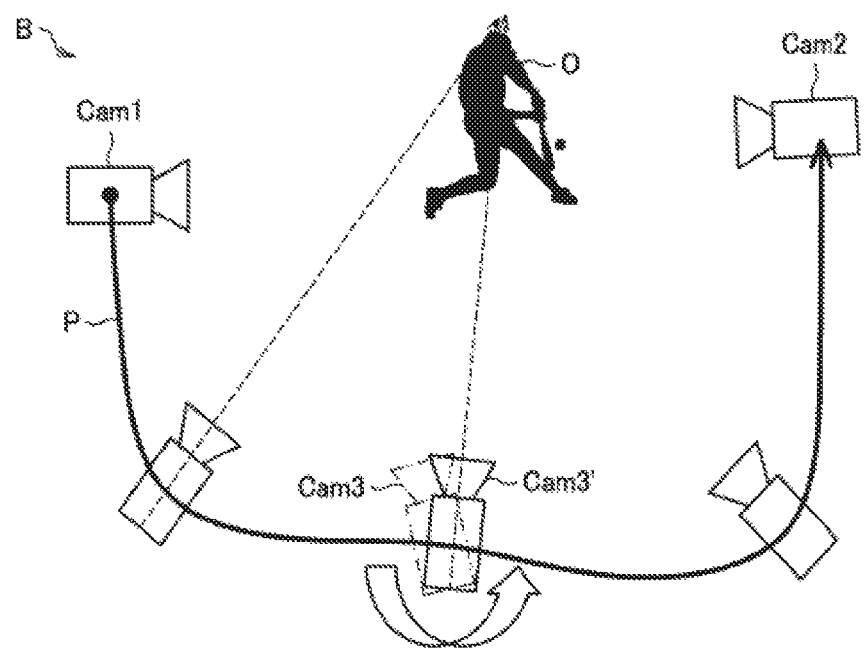

[Fig. 8B]
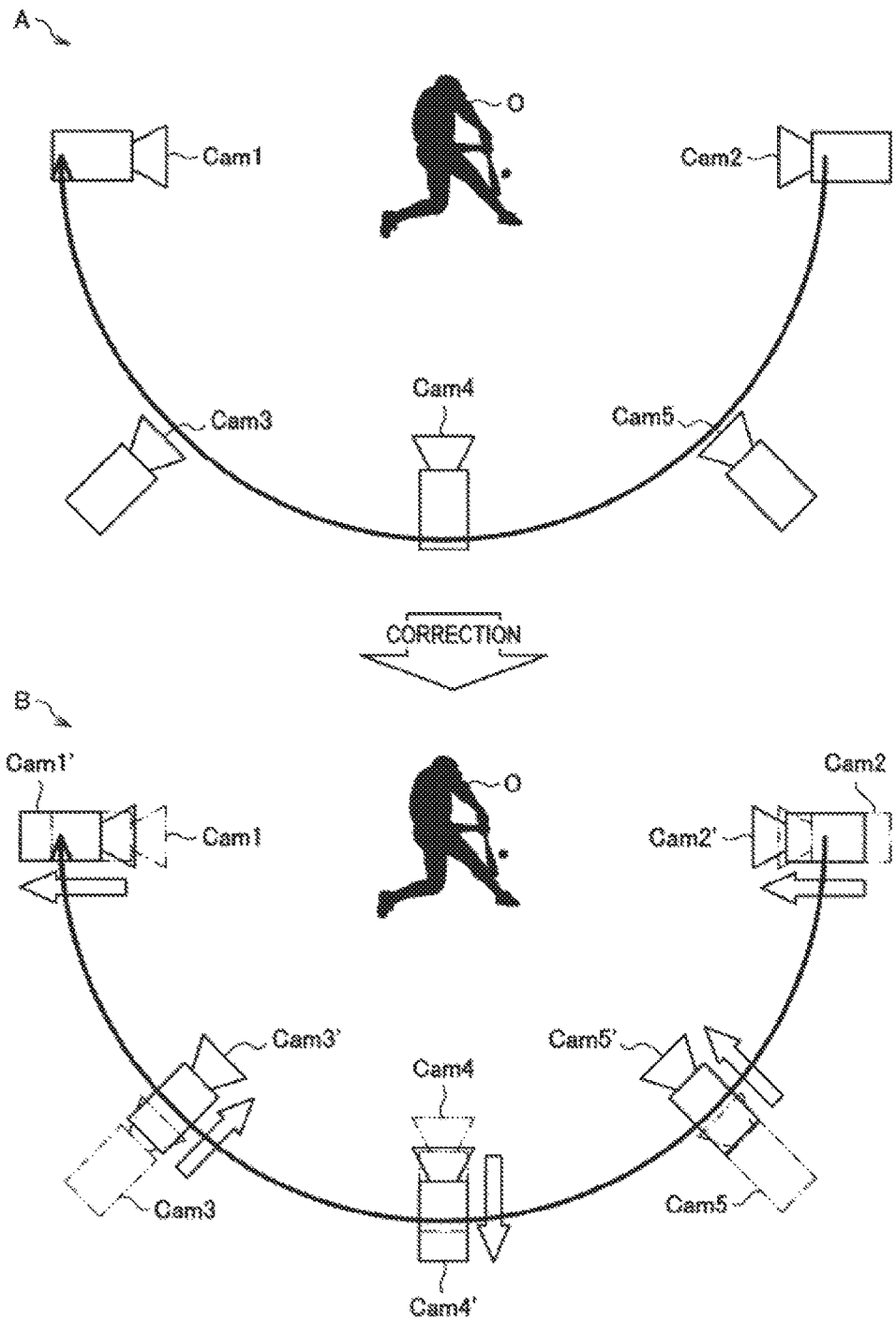

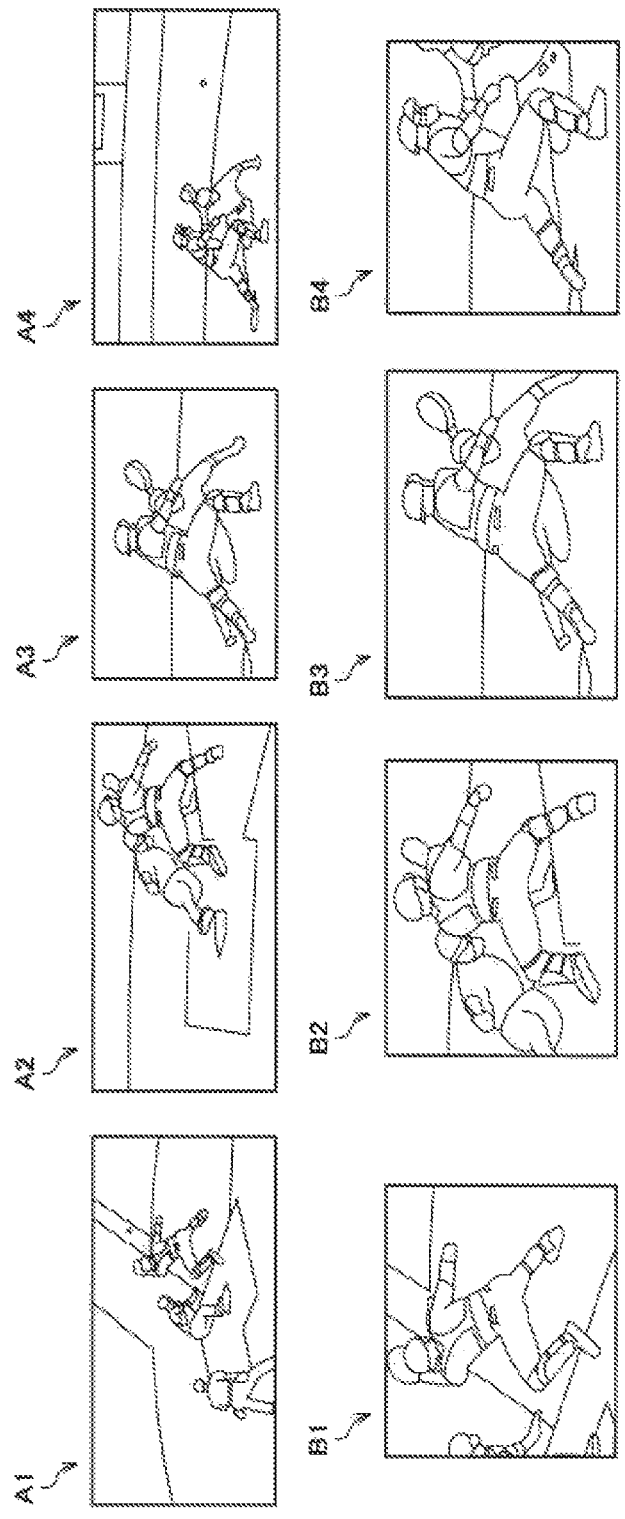

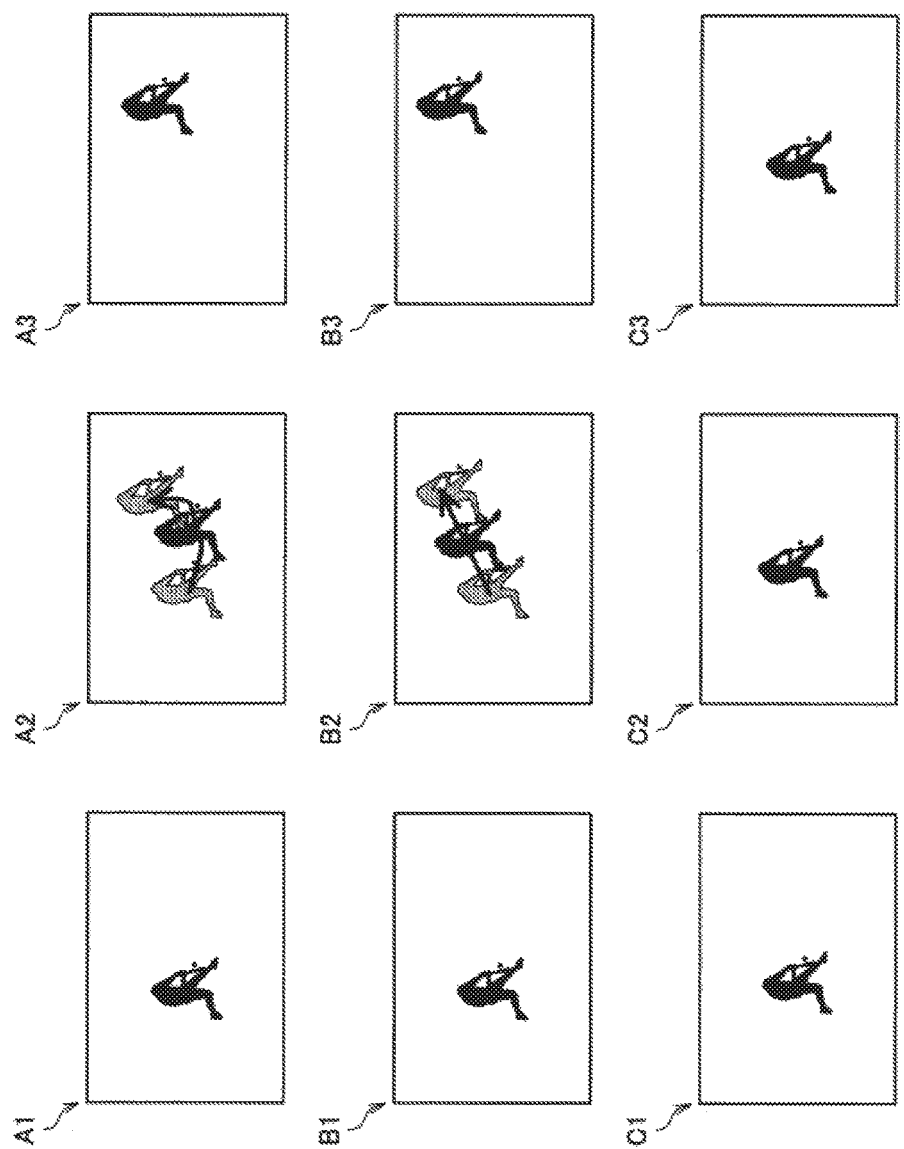
[Fig. 10]

[Fig. 11A]
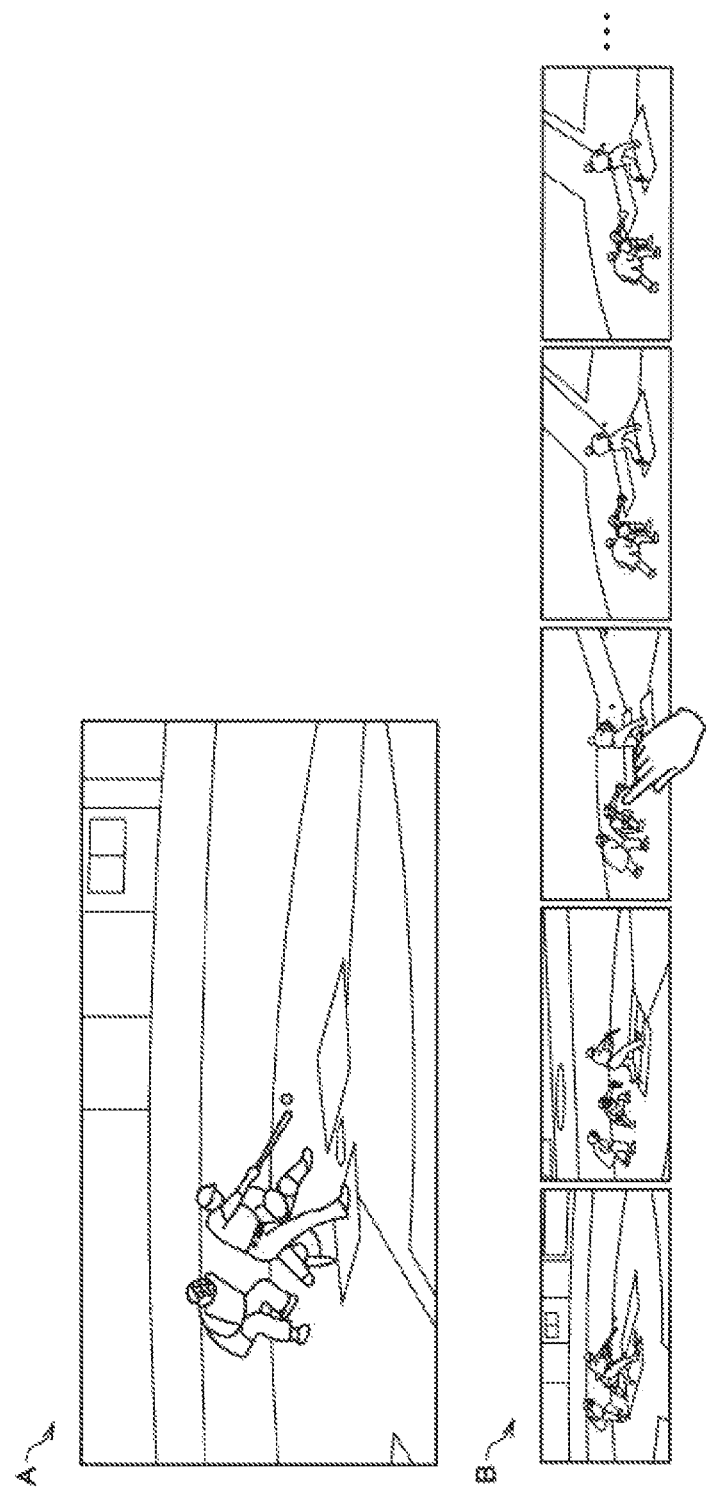

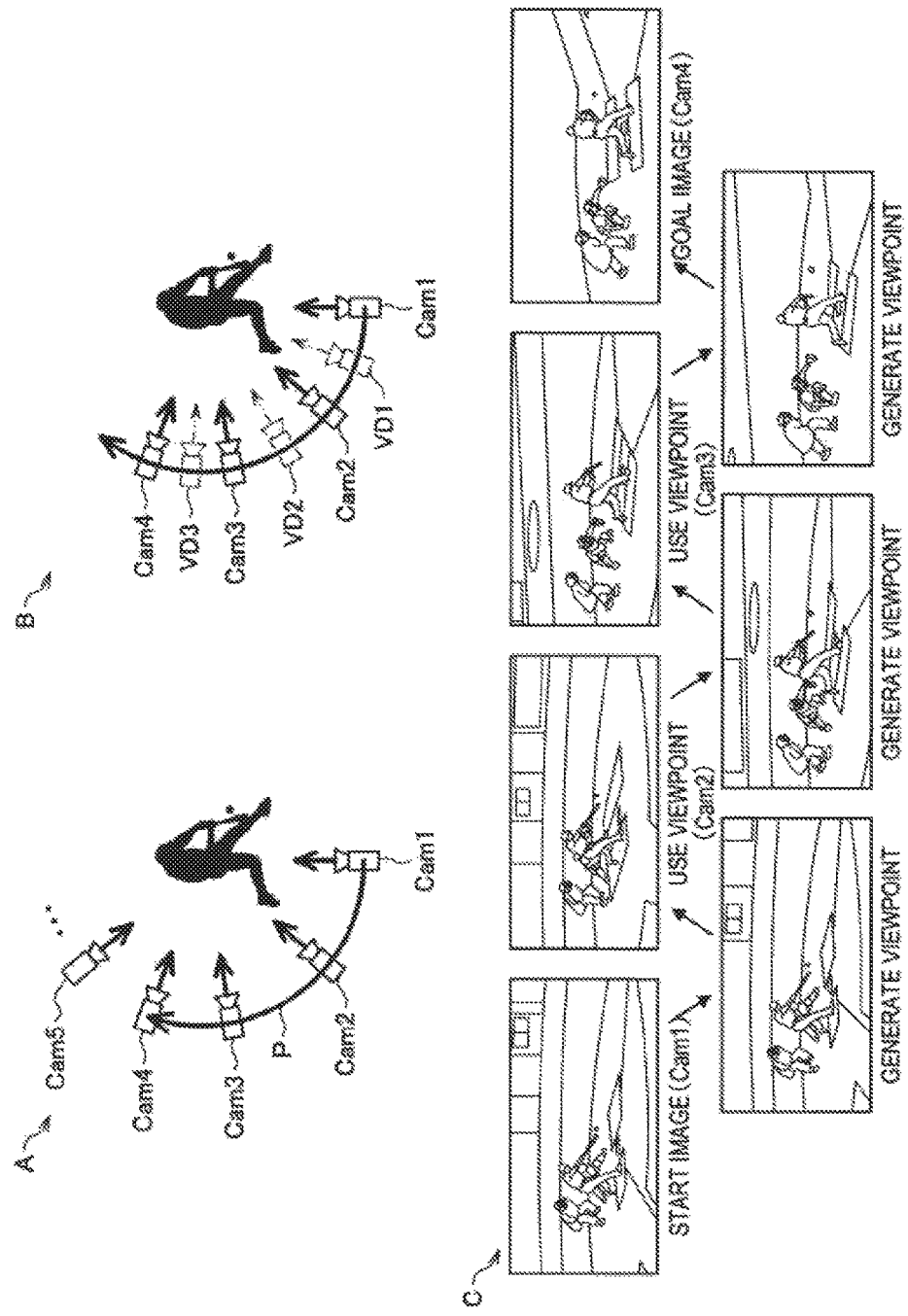
[Fig. 11B]

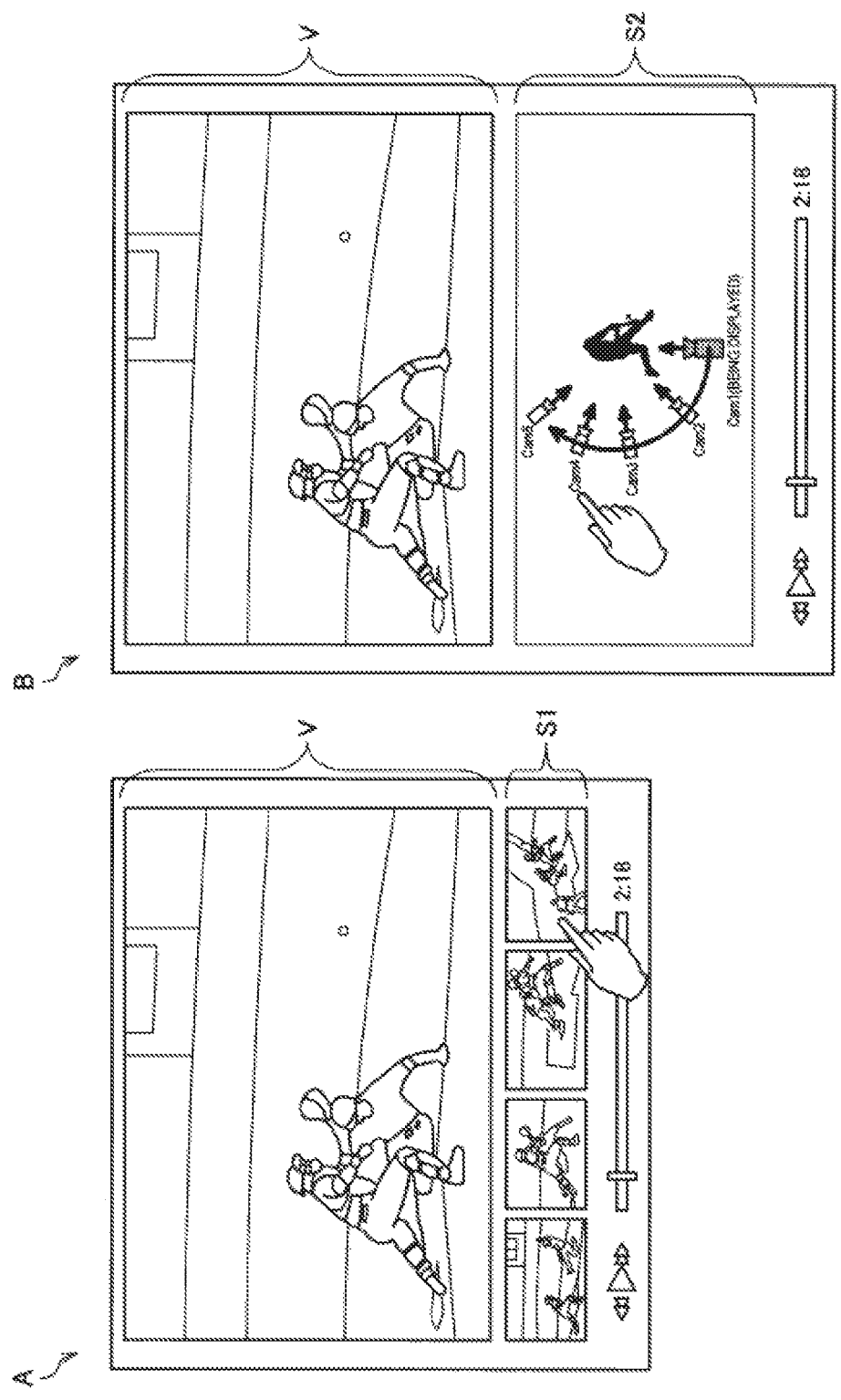
[Fig. 12]

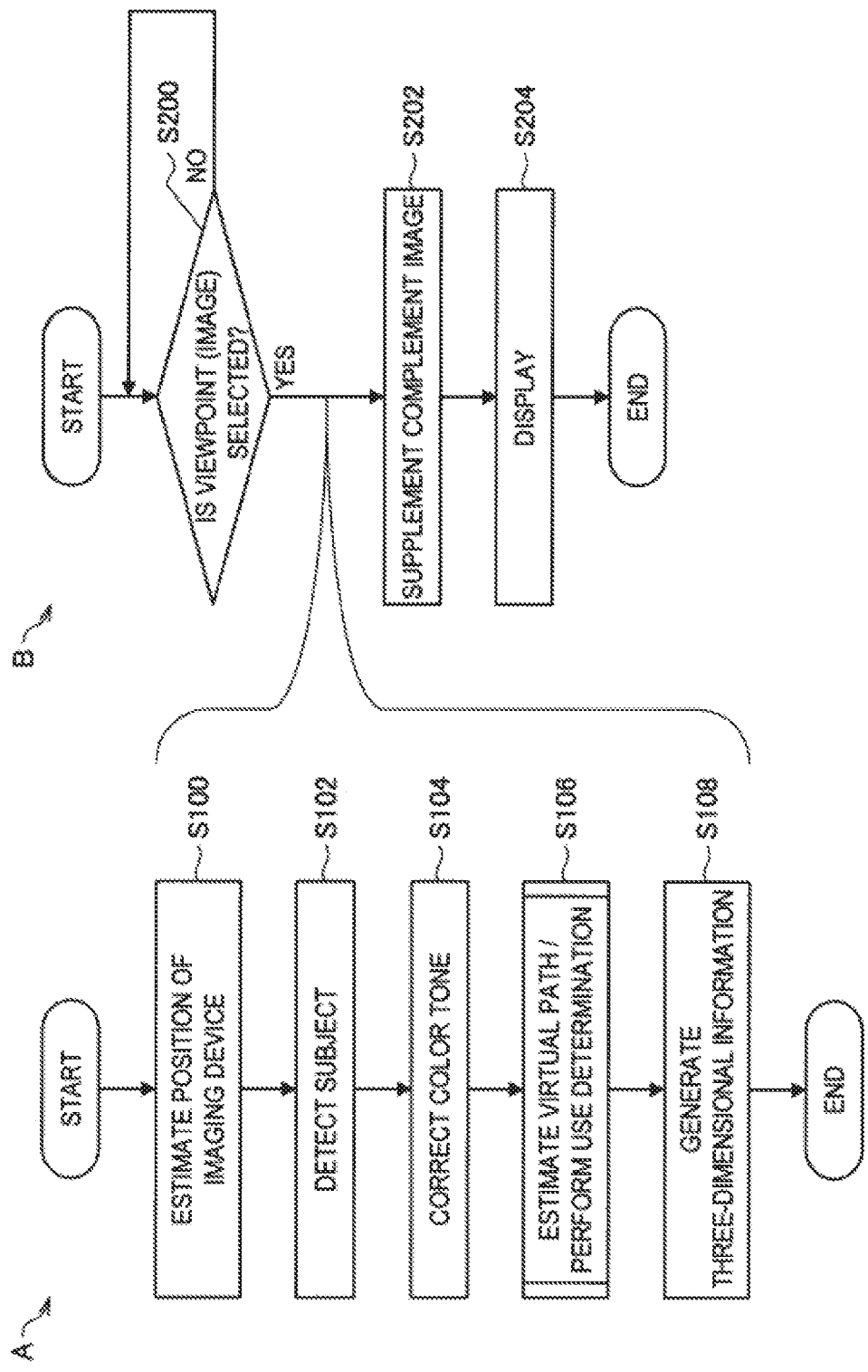
[Fig. 13]

[Fig. 14]
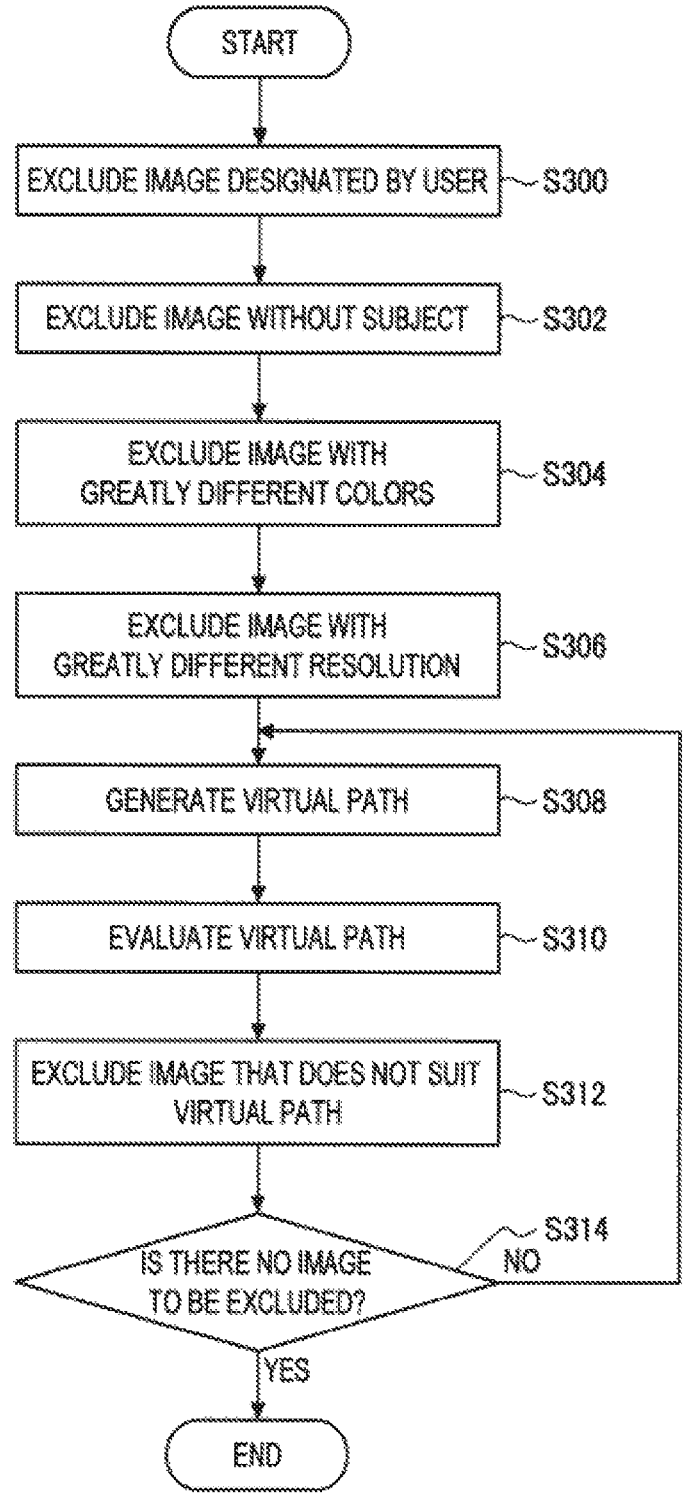

[Fig. 15]
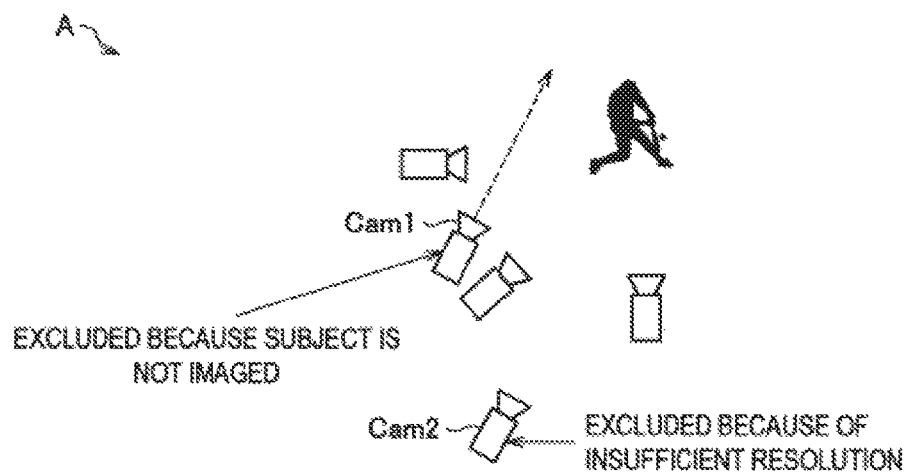
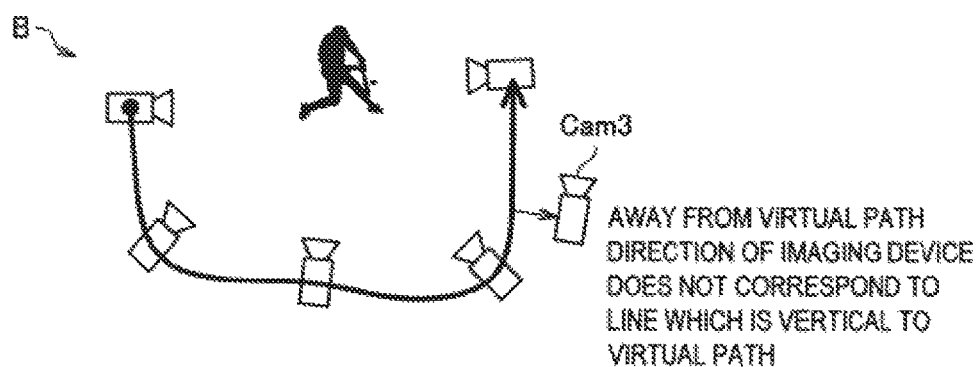
[Fig. 16]
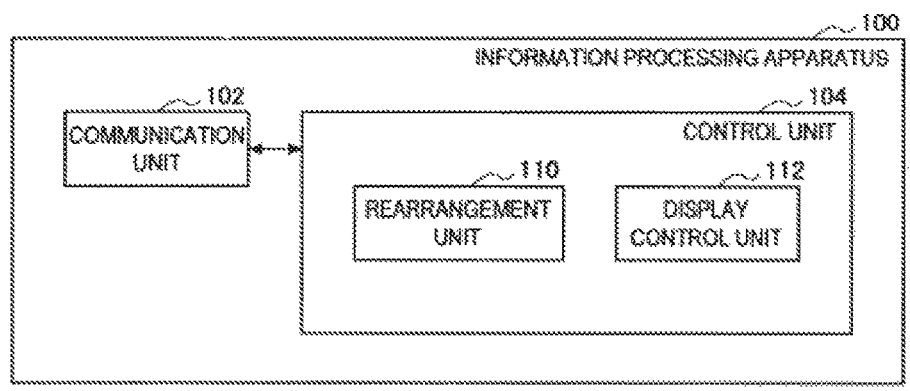

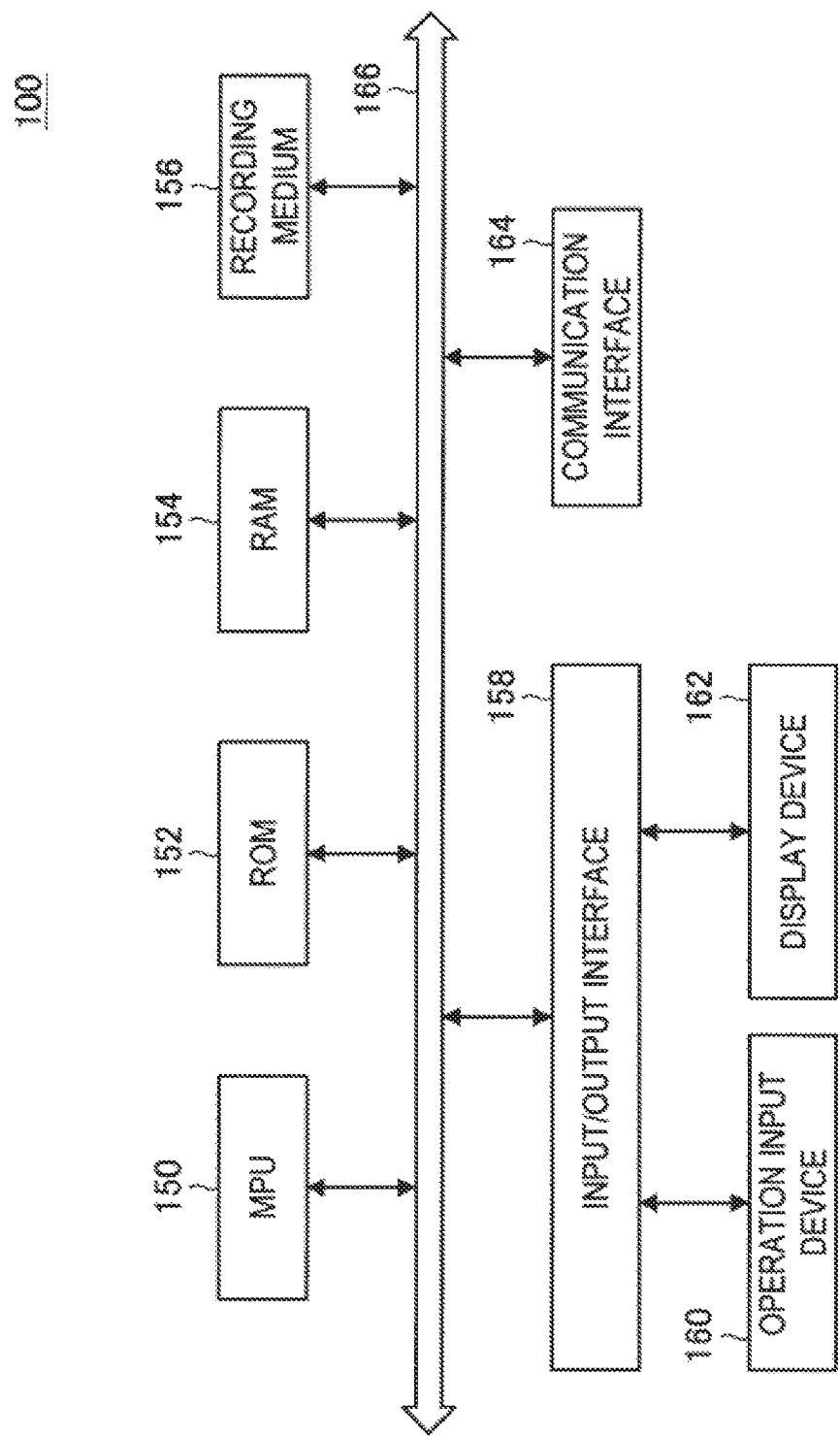
[Fig. 17]

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2015/002846 filed on Jun. 5, 2015, which claims priority benefit of Japanese Patent Application No. JP 2014-137930 filed in the Japan Patent Office on Jul. 3, 2014. Each of the above-referenced applications is hereby incorporated herein by reference in its entirety.

TECHNICAL FIELD

The present disclosure relates to an information processing apparatus, an information processing method and a program.

BACKGROUND ART

A technique that generates a moving image from an captured image captured by a plurality of imaging devices is developed. Examples of a technique that generates a moving image on the basis of the time at which an captured image is captured include the technique described in following PTL 1.

CITATION LIST

Patent Literature

[PTL 1]
JP 2012-4739A

SUMMARY

Technical Problem

For example, a plurality of imaging devices may be disposed to perform imaging by the plurality of imaging devices at the same time in a baseball stadium, a stadium and a concert venue, and so on. In a case where imaging is performed by the plurality of imaging devices at the same time as described above, the user may desire the switching of captured images displayed on a display screen.

The present disclosure suggests a new, improved information processing apparatus, information processing method and program that can achieve the improvement of user's convenience according to the switching of captured images.

Solution to Problem

An information processing apparatus has circuitry that connects a reference image and a target image with at least one of a plurality of complement images based on a reference viewpoint of a subject and a target viewpoint of the subject in response to an identification of the target viewpoint. Each of the plurality of complement images corresponds to a complementary viewpoint of the subject between the reference viewpoint and the target viewpoint. In one embodiment, at least one of the plurality of complement images is a captured image.

A method of operating an information processing apparatus includes connecting at least one of a plurality of complement images between a reference image and a target image based on a reference viewpoint of a subject and a target viewpoint of the subject in response to an identification of the target viewpoint. Each of the plurality of complement images corresponds to a complementary viewpoint of the subject between the reference viewpoint and the target viewpoint. Additionally, connecting complement images includes combining the plurality of complement images.

A non-transitory computer readable medium storing a program for controlling an information processing apparatus including circuitry, the program being executable to perform operations includes connecting at least one of a plurality of complement images between a reference image and a target image based on a reference viewpoint of a subject and a target viewpoint of the subject in response to an identification of the target viewpoint. Each of the plurality of complement images corresponds to a complementary viewpoint of the subject between the reference viewpoint and the target viewpoint.

Advantageous Effects of Invention

According to one or more embodiments of the present disclosure, it is possible to achieve the improvement of user's convenience according to the switching of captured images.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is an explanatory diagram to describe an information processing method according to the present embodiment.

FIG. 2 is an explanatory diagram illustrating one example of the hardware configuration of an imaging device according to the present embodiment.

FIG. 3 is an explanatory diagram to describe an information processing method according to the present embodiment.

FIG. 4 is an explanatory diagram to describe an information processing method according to the present embodiment.

FIG. 5A is an explanatory diagram to describe one example of processing related to an information processing method according to the present embodiment.

FIG. 5B is an explanatory diagram to describe one example of processing related to an information processing method according to the present embodiment.

FIG. 5C is an explanatory diagram to describe one example of processing related to an information processing method according to the present embodiment.

FIG. 6 is an explanatory diagram to describe one example of processing related to an information processing method according to the present embodiment.

FIG. 7 is an explanatory diagram to describe one example of processing related to an information processing method according to the present embodiment.

FIG. 8A is an explanatory diagram to describe one example of processing related to an information processing method according to the present embodiment.

FIG. 8B is an explanatory diagram to describe one example of processing related to an information processing method according to the present embodiment.

FIG. 9 is an explanatory diagram to describe one example of processing related to an information processing method according to the present embodiment.

FIG. 10 is an explanatory diagram to describe one example of processing related to an information processing method according to the present embodiment.

FIG. 11A is an explanatory diagram to describe one example of processing related to an information processing method according to the present embodiment.

FIG. 11B is an explanatory diagram to describe one example of processing related to an information processing method according to the present embodiment.

FIG. 12 is an explanatory diagram to describe one example of processing related to an information processing method according to the present embodiment.

FIG. 13 is a flowchart illustrating one example of processing related to an information processing method according to the present embodiment.

FIG. 14 is a flowchart illustrating one example of processing related to an information processing method according to the present embodiment.

FIG. 15 is an explanatory diagram to describe processing related to an information processing method according to the present embodiment.

FIG. 16 is a block diagram illustrating one example of the configuration of an information processing apparatus according to the present embodiment.

FIG. 17 is an explanatory diagram illustrating one example of the hardware configuration of an information processing apparatus according to the present embodiment.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, an explanation is given below in the following order.
1. Information processing method according to the present embodiment
2. Information processing apparatus according to the present embodiment
3. Program according to the present embodiment
(Information Processing Method According to the Present Embodiment)

Before the configuration of the information processing apparatus according to the present embodiment is described, the information processing method according to the present embodiment is described first. In the following, the information processing method according to the present embodiment is described using an example case where the information processing apparatus according to the present embodiment performs processing related to the information processing method according to the present embodiment.
<1> Outline of Information Processing Method According to Present Embodiment FIG. 1 is an explanatory diagram to describe the information processing method according to the present embodiment. A of FIG. 1 conceptually illustrates imaging by a plurality of imaging devices installed in a baseball stadium (one example of a plurality of imaging devices located in a predetermined region). Moreover, B1 to B6 of FIG. 1 illustrate one example of captured images captured by the plurality of imaging devices illustrated in A of FIG. 1 respectively.

Each imaging device according to the present embodiment generates an image (moving image or still image) by imaging. Part or all of the plurality of imaging devices may be included in the information processing apparatus according to the present embodiment or may be an external device (an imaging apparatus outside the information processing apparatus according to the present embodiment) that can perform communication with the information processing apparatus according to the present embodiment by wire or wireless. For example, in a case where part or all of the plurality of imaging devices are imaging apparatuses outside the information processing apparatus according to the present embodiment, the information processing apparatus according to the present embodiment and the imaging apparatuses form a system (information processing system).

Examples of an imaging device according to the present embodiment include a digital still camera and a digital video camera, and so on.

FIG. 2 is an explanatory diagram illustrating one example of the hardware configuration of the imaging device according to the present embodiment. For example, the imaging device according to the present embodiment includes a lens 10, an imaging element 12 and a signal processing circuit 14.

Moreover, for example, the imaging device according to the present embodiment may further include a processor that controls the whole of the imaging device, a communication device to perform communication with an external apparatus by wireless or wire, a display device that displays an image such as a captured image on a display screen, and an operation device that can be operated by the user, and so on.

The lens 10 includes a lens of an optical system, and, for example, the imaging element 12 includes an image sensor using a plurality of imaging elements such as a complementary metal oxide semiconductor (CMOS). For example, the signal processing circuit 14 includes an automatic gain control (AGC) circuit and an analog to digital converter (ADC), and converts an analog signal generated by the imaging element 12 into a digital signal (image data). Moreover, for example, the signal processing circuit 14 performs various kinds of processing related to raw development. In addition, for example, the signal processing circuit 14 may perform various kinds of signal processing such as white balance correction processing, color tone correction processing, gamma correction processing, YCbCr conversion processing and edge enhancement processing.

In the following, processing related to the information processing method according to the present embodiment is described using, as an example, a plurality of captured images captured by a plurality of imaging devices installed in a baseball stadium as illustrated in FIG. 1. Here, a plurality of imaging devices that image a plurality of captured images subject to processing related to the information processing method according to the present embodiment are not limited to the imaging devices installed in the baseball stadium. Examples of the imaging device according to the present embodiment include an imaging device located in a predetermined region such as a stadium and a concert venue. Moreover, each of the plurality of imaging devices may be located in a place in which it is possible to image the same subject. That is, examples of the plurality of imaging devices include an imaging device disposed in a predetermined region or a place in which it is possible to image the same subject. Moreover, it is needless to say that the plurality of captured images subject to processing related to the information processing method according to the present embodiment are not limited to the example illustrated in FIG. 1.

For example, when imaging is performed by the plurality of imaging devices located in a predetermined region at the same time as illustrated in A of FIG. 1, in a case where captured images acquired by imaging are arranged at random as illustrated in B1 to B6 of FIG. 1, the user who sees the captured images displayed on the screen has difficulty in understanding the relationship between the captured images. Here, examples of the understanding of the relationship between the captured images include understanding which place an imaging device that images each captured image is located in.

Moreover, in a case where the plurality of captured images are arranged at random as described above, it is difficult for the user to intuitively perform switching of display from one captured image to another captured image among the plurality of captured images.

Therefore, the information processing apparatus according to the present embodiment displays a plurality of captured images, which are generated by performing imaging by a plurality of imaging devices at the same time, in a mode corresponding to the positional relationship between the plurality of imaging devices. Further, the information processing apparatus according to the present embodiment switches images from one captured image among the plurality of displayed captured images to another image among the plurality of captured images and displays it (display control processing). Here, the switching of the plurality of captured images according to the present embodiment corresponds to viewpoint switching. In the following, an captured image of a switching source among a plurality of captured images to be switched and displayed is referred to as "reference image", and an image of a display switching destination among the plurality of captured images is referred to as "switching destination image".

For example, by displaying a plurality of captured images according to the arrangement order of the plurality of captured images arranged on the basis of the positional relationship at the time of imaging by a plurality of imaging devices, the information processing apparatus according to the present embodiment displays the plurality of captured images in a mode corresponding to the positional relationship between the plurality of imaging devices. A specific example of "display of the plurality of captured images in the mode corresponding to the positional relationship between the plurality of imaging devices" according to the present embodiment is described later.

Here, processing that arranges the plurality of captured images on the basis of the positional relationship between the plurality of imaging devices (hereinafter referred to as "rearrangement processing") may be performed by the information processing apparatus according to the present embodiment as processing related to the information processing method according to the present embodiment or may be performed in an external apparatus of the information processing apparatus according to the present embodiment. In a case where the information processing apparatus according to the present embodiment performs the rearrangement processing, the information processing apparatus according to the present embodiment displays the plurality of captured images according to the arrangement order of the plurality of captured images arranged in the rearrangement processing. Moreover, in a case where the rearrangement processing is performed in the external apparatus, the information processing apparatus according to the present embodiment displays the plurality of captured images according to the arrangement order of the plurality of captured images arranged in the external apparatus. In the following, an example case where the information processing apparatus according to the present embodiment performs the rearrangement processing is described.

In a case where the information processing apparatus according to the present embodiment performs the rearrangement processing, the information processing apparatus according to the present embodiment arranges the plurality of captured images, which are generated by performing imaging by the plurality of imaging devices at the same time, on the basis of the positional relationship at the time of imaging by the plurality of imaging devices. For example, the information processing apparatus according to the present embodiment arranges the plurality of captured images in a one-dimensional axis according to spatial regularity based on the positional relationship between the plurality of imaging devices such that the switching of the plurality of captured images is possible. Here, examples of the rearrangement processing according to the present embodiment include newly arranging a plurality of captured images that are not arranged and rearranging a plurality of captured images that are arranged according to some rules.

FIG. 3 is an explanatory diagram to describe the information processing method according to the present embodiment, and illustrates one example of rearrangement processing related to the information processing method according to the present embodiment. A of FIG. 3 illustrates one example of a plurality of captured images. C of FIG. 3 illustrates an example case where the plurality of captured images illustrated in A of FIG. 3 are arranged in a one-dimensional axis according to spatial regularity based on the positional relationship between a plurality of imaging devices illustrated in B of FIG. 3.

The information processing apparatus according to the present embodiment arranges the plurality of captured images by performing the rearrangement processing such that, for example, the plurality of imaging devices are spatially arranged as illustrated in B of FIG. 3.

Moreover, in a case where the plurality of captured images are arranged in the rearrangement processing, by performing display control processing, the information processing apparatus according to the present embodiment displays the plurality of captured images according to the arrangement order of the plurality of captured images arranged as illustrated in C of FIG. 3, for example. Further, the information processing apparatus according to the present embodiment switches images from one captured image among the plurality of displayed captured images to another image among the plurality of captured images and displays it.

Here, for example, the information processing apparatus according to the present embodiment displays the images on a display screen of a display unit (described later) included in the information processing apparatus according to the present embodiment or on a display screen of an external display device connected with the information processing apparatus according to the present embodiment by wireless or wire. The information processing apparatus according to the present embodiment displays an image on the display screen by transmitting image data showing the image to be displayed and a display order of the image to, for example, a display unit (described later), and so on.

Moreover, the information processing apparatus according to the present embodiment selectively performs supplement by one or two or more complement images on the basis of the positional relationship between an imaging device corresponding to a reference image and an imaging device corresponding to a switching destination image in the display control processing. Further, in a case where the complement image is supplemented, the information processing apparatus according to the present embodiment displays the complement image before the switching destination image is displayed. Processing that selectively supplements the complement image according to the present embodiment is described later.

Examples of the complement image according to the present embodiment includes one or both of "a captured image captured by an imaging device different from an imaging device corresponding to the reference image and an imaging device corresponding to the switching destination image" and "an image generated so as to correspond to a captured image captured by a virtual imaging device located on a virtual path". In the following, "an image generated so as to correspond to a captured image captured by a virtual imaging device located on a virtual path" is referred to as an "interpolation image," which can be a "generated image" or a combination of a "generated image" and a "captured image."

For example, the generated image according to the present embodiment is generated by a technique such as image-based rendering (IBR), model based rendering (MBR) and rectification. Here, in a case where IBR is used, for example, the generated image is generated on the basis of a plurality of captured images. Moreover, in a case where MBR is used, for example, the generated image is generated on the basis of the plurality of captured images and three-dimensional information (data illustrating depth) on the images. Moreover, in a case where rectification is used, the generated image is generated on the basis of, for example, data (for example, information on sensors such as an acceleration sensor and a gyro sensor) showing the posture of an imaging device. Moreover, the generated image according to the present embodiment may be an image acquired by further adjusting the color tone of the image generated by the above-described technique.

Here, a generated method of the generated image according to the present embodiment is not limited to the above. For example, the generated image according to the present embodiment may be an image acquired by performing image processing on one captured image among a plurality of captured images. Examples of the image processing according to the present embodiment include the expansion or reduction of the image, the rotation of the image, the cropping of the image and processing that combines two or more of these, and so on.

The generated image according to the present embodiment may be generated by one or more processors or various kinds of processing circuits included in the information processing apparatus according to the present embodiment, or may be generated by an external apparatus that can perform communication with the information processing apparatus according to the present embodiment by wireless or wire.

FIG. 4 is an explanatory diagram to describe the information processing method according to the present embodiment and illustrates one example of display control processing related to the information processing method according to the present embodiment.

A of FIG. 4 illustrates one example of an operation screen in which the user can perform operation related to the switching of images from among a plurality of displayed captured images (G illustrated in A of FIG. 4). V of A of FIG. 4 denotes a main image display region on which an image is displayed, and G of A of FIG. 4 is a selection region in which the user can perform operation to select a captured image.

By performing display control processing, the information processing apparatus according to the present embodiment displays a plurality of captured images according to the arrangement order of the plurality of captured images arranged in rearrangement processing as illustrated in G of A of FIG. 4, for example. That is, the plurality of captured images displayed in the selection region illustrated in G of A of FIG. 4 correspond to one example of the display of a plurality of captured images in a mode corresponding to the positional relationship between a plurality of imaging devices, which are displayed in the display control processing by the information processing apparatus according to the present embodiment.

Here, an example of the display of the plurality of captured images in the mode corresponding to the positional relationship between the plurality of imaging devices according to the present embodiment is not limited to the example illustrated in G of A of FIG. 4. For example, the information processing apparatus according to the present embodiment can also display a plurality of captured images in a plurality of stages according to the arrangement order of the plurality of captured images arranged in the rearrangement processing as illustrated in C of FIG. 3.

The information processing apparatus according to the present embodiment switches images from a reference image to a switching destination image and displays it on the basis of a user operation with respect to an operation screen as illustrated in A of FIG. 4, for example. Images such as the reference image, the switching destination image and a complement image are displayed in the main image display region of the operation screen as illustrated in V of A of FIG. 4, for example.

Here, examples of the user operation according to the present embodiment such as a user operation with respect to the operation screen include an operation using operation devices such as a mouse, a keyboard and a remote controller, and an operation with respect to a touch panel in which an operation screen is displayed, and so on.

Examples of the display of an image according to the present embodiment include examples illustrated in following (i) to (iii), for example. Here, It is needless to say that an example of the display of the image according to the present embodiment is not limited to the examples illustrated in following (i) to (iii).

(i) When Image is Still Image

Each still image is simply displayed in the main image display region of the operation screen as illustrated in V of A of FIG. 4 and the selection region of the operation screen as illustrated in G of A of FIG. 4. At the switching of images, the angle of an image displayed in the main image display region by the switching changes.

(ii) First Example when Image is Moving Image

A moving image is reproduced in the main image display region of the operation screen as illustrated in V of A of FIG. 4 and the selection region of the operation screen as illustrated in G of A of FIG. 4. At the switching of images, an image angle changes while a moving image displayed in the main image display region by the switching is continuously reproduced.

(iii) Second Example when Image is Moving Image

A moving image is reproduced in the main image display region of the operation screen as illustrated in V of A of FIG.

4 and the selection region of the operation screen as illustrated in G of A of FIG. 4. At the switching of images, the reproduction of each moving image displayed in the main image display region and the selection region is paused. Further, after the change in the image angle is completed, the reproduction of each moving image displayed in the main image display region and the selection region is resumed.

B of FIG. 4 illustrates one example of the switching of images realized in display control processing. B of FIG. 4 illustrates an example where five complement images (captured images and generated images illustrated in FIG. 4) are supplemented and displayed at switching from a reference image (start image illustrated in B of FIG. 4) to a switching destination image (goal image illustrated in B of FIG. 4).

Here, the captured images of five complement images illustrated in B of FIG. 4 are images captured by other imaging devices than an imaging device corresponding to the reference image and an imaging device corresponding to the switching destination image. A case where the captured images captured by above-described other imaging devices are used as complement images corresponds to a case where viewpoints from imaging devices located in a predetermined region are used.

Moreover, the generated images of five complement images illustrated in B of FIG. 4 are images generated by techniques such as IBR, MBR and rectification, for example. A case where the generated images are used as complement images corresponds to a case where virtual imaging devices are virtually disposed in a predetermined region and viewpoints from the virtual imaging devices are generated.

C of FIG. 4 conceptually illustrates the positional relationship between imaging devices corresponding to the switching of the images illustrated in B of FIG. 4. RD illustrated in C of FIG. 4 illustrates an imaging device located in a predetermined region, and VD illustrated in C of FIG. 4 illustrates a virtual imaging device virtually located in a predetermined region.

For example, as illustrated in B of FIG. 4, by connecting complement images between the reference image and the destination image, smoother image switching is realized.

Here, the image switching realized in the display control processing according to the present embodiment is not limited to the example illustrated in B of FIG. 4.

For example, in the case of detecting a predetermined subject to be noted by the user from images (for example, a reference image, a switching destination image and a complement image, and so on) and switching images, the information processing apparatus according to the present embodiment can also perform image processing on images such that the display position of the detected predetermined subject smoothly changes, and display the images subjected to the image processing. Moreover, for example, in the case of image switching, the information processing apparatus according to the present embodiment may perform image processing on images such that the display position and size of the detected predetermined subject do not change, and may display the images subjected to the image processing.

FIG. 5A to FIG. 5C are explanatory diagrams to describe one example of processing related to the information processing method according to the present embodiment.

A predetermined subject is set when the user performs an operation to select the subject with respect to all captured images as illustrated in FIG. 5A, for example (manual setting of the predetermined subject). Moreover, a predetermined subject may be set when the user performs an operation to select the subject with respect to one captured image among a plurality of captured images as illustrated in FIG. 5B, for example (semiautomatic setting of the predetermined subject).

Moreover, a predetermined subject can also be set by estimating the position in which the predetermined subject exists, on the basis of directions to which a plurality of imaging devices are directed as illustrated in FIG. 5C, for example (automatic setting of the predetermined subject). In a case where the predetermined subject is automatically set, for example, a subject included in the region of interest in an image such as a region in the vicinity of the center of the image, and so on, is set as the predetermined subject.

Moreover, in a case where a predetermined subject is set, the information processing apparatus according to the present embodiment learns the feature of the predetermined subject and stores data showing the feature of the predetermined subject in a recording medium such as a storage unit (described later) and a connected external recording medium. Further, the information processing apparatus according to the present embodiment detects the subject from an image (for example, a reference image, a switching destination image and a complement image, and so on) by using the data showing the feature of the predetermined subject.

For example, by setting a predetermined subject as described above, the information processing apparatus according to the present embodiment can track the predetermined subject (detect the subject automatically in the time direction) from images corresponding to imaging at different times such as other frame images (which are examples in a case where a captured image is a moving image).

For example, the information processing apparatus according to the present embodiment performs the above-described display control processing as processing related to the information processing method according to the present embodiment. Moreover, for example, the information processing apparatus according to the present embodiment can also perform rearrangement processing and display control processing as the processing related to the information processing method according to the present embodiment.

Here, in a case where the information processing method according to the present embodiment is used, a plurality of captured images are displayed in a mode corresponding to the positional relationship between a plurality of imaging devices like an example where the plurality of captured images are displayed in the above-described display control processing according to the arrangement order of the plurality of captured images arranged on the basis of the positional relationship at imaging by the plurality of imaging devices. Moreover, the rearrangement of the plurality of captured images is realized by the above-described rearrangement processing, for example. Therefore, for example, since the arrangement of captured images corresponds to the spatial disposition of imaging devices in an operation screen on which the plurality of captured images are displayed as illustrated in A of FIG. 4, the user can perform an operation related to image switching with respect to operation screen more intuitively.

Moreover, in a case where the information processing method according to the present embodiment is used, smoother image switching is realized in the above-described display control processing at image switching from a reference image to a switching destination image. Moreover, when the smoother image switching is realized, for example, the user who sees displayed images can concentrate on a subject to be noted.

Therefore, by performing processing related to the information processing method according to the present embodiment, it is possible to achieve the improvement of user's convenience related to the switching of captured images.

Moreover, since processing related to the information processing method according to the present embodiment is performed on captured images captured by a plurality of imaging devices, it can be performed as post-processing of imaging. Therefore, even if a plurality of imaging devices disposed in a predetermined region are disposed at positions separated from ideal viewpoint positions, smoother image switching is realized in the processing related to the information processing method according to the present embodiment. Therefore, since the imaging devices can be disposed in the predetermined region more roughly in a case where the information processing method according to the present embodiment is used, for example, it is possible to achieve the reduction of efforts to dispose the imaging devices and the shortening of time necessary to dispose the imaging devices.

Here, "the above-described display control processing" and "the above-described rearrangement processing and the above-described display control processing" are division of the processing related to the information processing method according to the present embodiment for convenience' sake. Therefore, in the processing related to the information processing method according to the present embodiment, for example, "the above-described rearrangement processing and the above-described display control processing" can be interpreted as one processing. Moreover, in the processing related to the information processing method according to the present embodiment, for example, each of "the above-described display control processing" and "the above-described rearrangement processing and the above-described display control processing" can be interpreted as two or more pieces of processing (by an arbitrary division method). In the following, an example case is given where the processing related to the information processing method according to the present embodiment is divided into the above-described rearrangement processing and the above-described display control processing. Here, the above-described rearrangement processing may be performed in an external apparatus of the information processing apparatus according to the present embodiment as described above.

<2> Processing Related to Information Processing Method According to Present Embodiment Next, the processing related to the information processing method according to the present embodiment is described more specifically.

(1) Rearrangement Processing

The information processing apparatus according to the present embodiment arranges a plurality of captured images generated by imaging performed at the same time by a plurality of imaging devices located in a predetermined region, on the basis of the positional relationship between a plurality of imaging devices.

For example, the information processing apparatus according to the present embodiment estimates the position and posture of an imaging device by the use of one or both of a captured image and sensor information (data) acquired from a sensor such as a global positioning system (GPS) device and an acceleration sensor.

Here, in a case where the position and posture of the imaging device are estimated by the use of the captured image, for example, the information processing apparatus according to the present embodiment estimates the position and posture of the imaging device from the captured image by the use of a structure from motion (SfM) technique that can estimate the position and posture of the imaging device from the relationship of a subject included in the image.

Moreover, for example, in a case where the SfM technique is used, the information processing apparatus according to the present embodiment can acquire an imaging parameter (for example, a parameter showing a focal distance or distortion) of the imaging device from the captured image. Therefore, in a case where the position and posture of the imaging device are estimated by the use of the captured image as described above, for example, even when the captured image is a captured image captured by an imaging device that performs imaging in a zoom state or the captured image is a captured image captured by an imaging device that performs imaging in a wide angle state, it is possible to estimate the position and posture of the imaging device that performs imaging from the captured image.

Moreover, examples of the above-described sensor include a sensor included in the imaging device, an external sensor connected with the imaging device and an external sensor attached to the imaging device by a seal, and so on.

Further, the information processing apparatus according to the present embodiment arranges a plurality of captured images on the basis of a spatial positional relationship of the imaging device based on the estimated position and posture of the imaging device.

As described above, the position and posture of an imaging device are estimated by the use of one or both of a captured image and sensor information. That is, examples of the spatial positional relationship of the imaging device according to the present embodiment may include a physical positional relationship of the imaging device (a physical positional relationship of the imaging position of the imaging device) based on position data (one example of sensor information) acquired from a GPS device, and so on, and the positional relationship of the imaging device based on information estimated from the captured image.

Here, the positional relationship of the imaging device based on the information estimated from the captured image is not limited to the example described above. For example, the information processing apparatus according to the present embodiment can also estimate the distance from a subject by the size of a predetermined subject included in an captured image and decide the positional relationship of an imaging device by the use of the estimated distance. In a case where the distance from the subject is estimated by the size of the predetermined subject included in the captured image as described above, for example, when the size of the predetermined subject which is included in an captured image captured by one imaging device that performs imaging in a zoom state and the one included in an captured image captured by a different imaging device that performs imaging in a wide angle state are substantially identical, the positional relationship as the distance relationship with the subject is substantially identical in the one imaging device and the different imaging device.

The information processing apparatus according to the present embodiment arranges a plurality of captured images, for example, on the basis of an captured image that becomes a source and the direction in which captured images are arranged. Examples of the captured image that becomes the source include an captured image displayed on a main image display region of an operation screen (for example, V illustrated in A of FIG. 4). Moreover, the captured image that becomes the source and the arrangement direction may be specified by a user operation or may be decided by the information processing apparatus according to the present embodiment on the basis of a predetermined rule such as random.

Moreover, in a case where the currently displayed image such as an image displayed on the main image display region of the operation screen (for example, V illustrated in A of FIG. 4) changes, for example, the information processing apparatus according to the present embodiment rearranges a plurality of captured images centering on the currently displayed image and adaptively changes the arrangement of the plurality of captured images.

FIG. 6 is an explanatory diagram to describe one example of processing related to the information processing method according to the present embodiment and illustrates one example of rearrangement processing.

A of FIG. 6 conceptually illustrates a way of arranging captured images in a case where two imaging devices are located in a predetermined region, by the positional relationship of the imaging devices. B of FIG. 6 conceptually illustrates a way of arranging captured images in a case where three imaging devices are located in a predetermined region, by the positional relationship of the imaging devices. C of FIG. 6 conceptually illustrates a way of arranging captured images in a case where four imaging devices are located in a predetermined region, by the positional relationship of the imaging devices. D of FIG. 6 conceptually illustrates a way of arranging captured images in a case where eight imaging devices are located in a predetermined region, by the positional relationship of the imaging devices.

As described above, it is possible to understand the spatial positional relationship of imaging devices by estimating the positions and posture of the imaging devices, for example. Therefore, when an captured image that becomes a source and the direction in which captured images are arranged are decided as described above, the information processing apparatus according to the present embodiment can arrange a plurality of captured images according to the spatial regularity of the positional relationship of imaging devices as illustrated in FIG. 6, for example. Here, the spatial regularity of the positional relationship of imaging devices may be, for example, regularity corresponding to the same subject captured by a plurality of imaging devices.

Here, the information processing apparatus according to the present embodiment can also set the priority (priority according to the spatial regularity of the positional relationship of imaging devices) to a plurality of captured images on the basis of the captured image that becomes the source and the direction in which captured images are arranged, and arrange the plurality of captured images according to the set priority.

When a specific example is cited, the information processing apparatus according to the present embodiment sets the highest priority to the captured image that becomes the source, for example. Moreover, the information processing apparatus according to the present embodiment sets a higher priority in order from an captured image captured by an imaging device to which the distance from an imaging device corresponding to an captured image that becomes a source is closer, for example, along the arrangement direction as illustrated in A to D of FIG. 6, that is, the direction in which the priority is set. For example, as illustrated in D of FIG. 6, in a case where the direction in which the priority is set is the direction along a trajectory that reaches the position of an imaging device corresponding to an captured image that finally becomes a source, the information processing apparatus according to the present embodiment finishes the setting of priority with respect to captured images when it reaches the position of the imaging device corresponding to the captured image that becomes the source. Moreover, as illustrated in the right diagram of A to C of FIG. 6, in a case where the direction in which the priority is set is a direction along a trajectory that does not reach the position of the imaging device corresponding to the captured image that finally becomes the source, for example, the information processing apparatus according to the present embodiment finishes the setting of the priority with respect to captured images in a case where captured images to which the priority is set become a set predetermined number or in a case where a predetermined time has passed since the setting of the priority began.

In a case where a plurality of captured images are arranged according to the priority set as described above, a plurality of captured images are assumed to be displayed in the display control processing according to the present embodiment, according to the order corresponding to the set priority.

For example, the information processing apparatus according to the present embodiment performs rearrangement processing with respect to captured images acquired from all imaging devices located in a predetermined region.

Here, the rearrangement processing according to the present embodiment is not limited to the above. For example, the information processing apparatus according to the present embodiment can also arrange a plurality of captured images while excluding a predetermined captured image from captured images acquired from a plurality of imaging devices located in a predetermined region as illustrated in following (a) to (f).

(a) First Example of Rearrangement Processing According to Exclusion of Captured Image The information processing apparatus according to the present embodiment arranges a plurality of captured images while excluding an captured image specified by the user among the plurality of captured images.

For example, a user operation related to the exclusion of an captured image is performed on an arbitrary screen in which the user can select the captured image to be excluded, such as the operation screen as illustrated in A of FIG. 4 and a screen in which a plurality of captured images are listed and displayed and the captured image to be excluded can be selected. Moreover, for example, the user operation related to the exclusion of the captured image may be an operation to select an imaging device that does not use an captured image.

(b) Second Example of Rearrangement Processing Related to Exclusion of Captured Image The information processing apparatus according to the present embodiment arranges a plurality of captured images while excluding an captured image in which a predetermined object is not included among a plurality of captured images.

Here, examples of the predetermined object according to the present embodiment include an object detected by the user from an captured image, an object detected from the plurality of captured images and a set object.

For example, when the user performs an operation as illustrated in FIG. 5A and FIG. 5B, a subject is selected from captured images. Moreover, examples of the object detected from the plurality of captured images include a subject included in a set region such as the vicinity of the center in captured images of the number equal to or greater than a set threshold (or captured images of the number greater than the threshold). Moreover, the set object according to the present embodiment may be an object set beforehand and may be a subject set as a result of learning the feature of an object specified from an captured image by a user operation.

For example, in a case where a subject having a feature corresponding to data showing the feature of a predetermined object is not included in an captured image, the information processing apparatus according to the present embodiment assumes that it is an captured image that does not include the predetermined object, and excludes the captured image.

(c) Third Example of Rearrangement Processing According to Exclusion of Captured Image The information processing apparatus according to the present embodiment arranges a plurality of captured images while excluding an captured image on the basis of colors included in captured images. For example, the information processing apparatus according to the present embodiment determines an captured image with colors greatly different from other captured images. Further, the captured image determined to have the greatly different colors is excluded.

Here, for example, the information processing apparatus according to the present embodiment calculates the color histogram of each captured image and determines an captured image with greatly different colors from other captured images on the basis of the calculated color histogram. Here, a method of determining the captured image with greatly different colors from other captured images according to the present embodiment is not limited to the above, and the information processing apparatus according to the present embodiment can use an arbitrary method that can determine an image with greatly different colors from other images.

(d) Fourth Example of Rearrangement Processing According to Exclusion of Captured Image The information processing apparatus according to the present embodiment arranges a plurality of captured images while excluding an captured image on the basis of the resolution of the captured image.

For example, the information processing apparatus according to the present embodiment determines an captured image with greatly different resolution from other captured images. Further, the captured image determined to have greatly different resolution is excluded.

Here, for example, the information processing apparatus according to the present embodiment determines an captured image whose "absolute value of the difference between the resolution of an captured image and the average resolution of a plurality of captured images" is equal to or greater than a set threshold (or an captured image whose absolute value is greater than the threshold), as an captured image with greatly different resolution from other captured images. Here, a method of determining the captured image with greatly different resolution from other captured images according to the present embodiment is not limited to the above, and the information processing apparatus according to the present embodiment can use an arbitrary method that can determine an image with greatly different resolution from other images.

Here, the fourth example of rearrangement processing according to the exclusion of an captured image is not limited to the above.

For example, the information processing apparatus according to the present embodiment may exclude an captured image having resolution equal to or less than the first resolution corresponding to the lower limit of resolution (or an captured image having less resolution than the first resolution). Moreover, for example, the information processing apparatus according to the present embodiment may exclude an captured image having resolution equal to or greater than the second resolution corresponding to the upper limit of resolution (or an captured image having resolution greater than the second resolution).

(e) Fifth Example of Rearrangement Processing According to Exclusion of Captured Image By processing combining two or more pieces of processing of the first example illustrated in above (a) to the fourth example illustrated in above (d), the information processing apparatus according to the present embodiment may arrange a plurality of captured images after excluding a captured image.

(f) Sixth example of rearrangement processing according to exclusion of captured image In a case where even an image excluded in the processing according to the first example illustrated in above (a) to the fifth example illustrated in above (e) is added again by a user operation, the information processing apparatus according to the present embodiment can arrange a plurality of captured images without excluding the added image.

(2) Display Control Processing

The information processing apparatus according to the present embodiment switches and displays images from a reference image to a switching destination image among the plurality of captured images arranged in processing (rearrangement processing) of above (1).

Moreover, at image switching, the information processing apparatus according to the present embodiment selectively supplement one or two or more complement images on the basis of the positional relationship between an imaging device corresponding to the reference image and an imaging device corresponding to the switching destination image. Further, in a case where the complement image is supplemented, the information processing apparatus according to the present embodiment displays the complement image before displaying the switching destination image as illustrated in B of FIG. 4.

Here, for example, the information processing apparatus according to the present embodiment selectively supplements the complement image on the basis of the distance between the imaging device corresponding to the reference image and the imaging device corresponding to the switching destination image.

Examples of "the distance between one imaging device and another imaging device" according to the present embodiment include a straight line distance between one imaging device and another imaging device. For example, the distance between one imaging device and another imaging device is calculated by the position of an imaging device estimated from a captured image and a position indicated by sensor information acquired from a sensor of a GPS device, and so on.

Here, "the distance between one imaging device and another imaging device" according to the present embodiment is not limited to the above.

For example, "the distance between one imaging device and another imaging device" according to the present embodiment may be the distance of a virtual display switching path (hereinafter referred to as "virtual path") related to the switching of image display between one imaging device and another imaging device. The virtual path according to the present embodiment is set on the basis of the positional relationship between an imaging device corresponding to a reference image and an imaging device corresponding to a switching destination image. For example, the virtual path according to the present embodiment is set as a path with respect to the same subject captured by a plurality of imaging devices. A specific example of the virtual path according to the present embodiment is described later.

To be more specific, the information processing apparatus according to the present embodiment supplements a complement image in a case where the distance between the imaging device corresponding to the reference image and the imaging device corresponding to the switching destination image is equal to or greater than a set threshold (or in a case where the distance is greater than the threshold). Moreover, the information processing apparatus according to the present embodiment does not supplement a complement image in a case where the distance between the imaging device corresponding to the reference image and the imaging device corresponding to the switching destination image is less than a set threshold (or in a case where the distance is equal to or less than the threshold). The above-described threshold may be a fixed value set beforehand or may be a changeable value that can be changed by a user operation, and so on.

Moreover, the information processing apparatus according to the present embodiment may supplement complement images of the number corresponding to the distance between the imaging device corresponding to the reference image and the imaging device corresponding to the switching destination image, by the use of, for example, a table with which the distance and the number of complement images are associated and a distance function that uniquely calculates the number of complement images.

For example, in the case of switching and displaying images (for example, a reference image, a switching destination image and a complement image, and so on) the information processing apparatus according to the present embodiment displays an image corresponding to a set virtual path on the basis of the set virtual path.

Here, images corresponding to the virtual path according to the present embodiment include a captured image captured by an imaging device located on the virtual path and a generated image generated so as to correspond to a captured image captured by a virtual imaging device located on the virtual path.

When a specific example is cited, examples of the images corresponding to the virtual path according to the present embodiment include images listed below.

Reference image (when the position of an imaging device corresponding to the reference image is on the virtual path)

Generated image generated by performing image processing on the reference image (when the position of the imaging device corresponding to the reference image is not on the virtual path)

Switching destination image (when the position of an imaging device corresponding to a switching destination image is on the virtual path)

Generated image generated by performing image processing on the switching destination image (the position of the imaging device corresponding to the switching destination image is not on the virtual path)

Captured image captured by an imaging device which is located on the virtual path and is different from the imaging device corresponding to the reference image and the imaging device corresponding to the switching destination image Generated image generated on the basis of the captured image captured by above-described different imaging device, and so on In the following, the generated image generated by performing image processing on the reference image is expressed as "image based on the reference image". Moreover, in the following, the generated image generated by performing image processing on the switching destination image is expressed as "image based on the switching destination image".

In the following, one example of display control processing according to the present embodiment is described more specifically.

(2-1) First Example of Display Control Processing According to Present Embodiment: One Example of Processing Related to Setting of Virtual Path First, one example of processing related to the setting of a virtual path is described.

FIG. 7 is an explanatory diagram to describe one example of the processing related to the information processing method according to the present embodiment and illustrates one example of the processing related to the setting of the virtual path in the display control processing according to the present embodiment. "Cam1" illustrated in FIG. 7 shows an imaging device corresponding to a reference image, and "Cam2" illustrated in FIG. 7 shows an imaging device corresponding to a switching destination image. Moreover, each of "P1", "P2" and "P3" illustrated in FIG. 7 shows one example of the virtual path.

For example, as illustrated in A of FIG. 7, the information processing apparatus according to the present embodiment sets a path in which an imaging device located between imaging device Cam1 corresponding to the reference image and imaging device Cam2 corresponding to the switching destination image is located on a virtual path, as the virtual path.

For example, by connecting imaging devices of adjacent positions by a straight line, the information processing apparatus according to the present embodiment sets a virtual path (for example, virtual path P1 illustrated in A of FIG. 7). Moreover, for example, by connecting imaging devices of adjacent positions by a curve line such as a Bezier curve, the information processing apparatus according to the present embodiment may set the virtual path (for example, virtual path P2 illustrated in A of FIG. 7).

Moreover, for example, the information processing apparatus according to the present embodiment can also set the virtual path on the basis of a user operation (for example, virtual path P3 illustrated in B of FIG. 7). For example, the user operation according to the setting of the virtual path may be an operation to correct a virtual path provisionally set by the information processing apparatus according to the present embodiment or may be an operation to newly set a virtual path.

The information processing apparatus according to the present embodiment sets a virtual path as described above, for example.

Here, processing related to the setting of the virtual path according to the present embodiment is not limited to the above-described example. For example, the information processing apparatus according to the present embodiment can also set a virtual path which is set beforehand, such as a circular arc having a predetermined curvature.

Moreover, the information processing apparatus according to the present embodiment can also perform the processing related to the setting of the virtual path according to the present embodiment in parallel with processing related to the exclusion of a predetermined captured image shown in above (a) to (f). That is, the information processing apparatus according to the present embodiment may selectively exclude a captured image while setting the virtual path.

(2-2) Second Example of Display Control Processing According to Present Embodiment: One Example of Processing Related to Display of Image Corresponding to Set Virtual Path Next, one example of processing related to the display of an image corresponding to a set virtual path is described.

FIG. 8A is an explanatory diagram to describe one example of processing related to the information processing method according to the present embodiment and illustrates one example of processing related to the display of an image corresponding to a virtual path in the display control processing according to the present embodiment. FIG. 8A indicates a case where a plurality of imaging devices are located on set virtual path P.

"Cam1" illustrated in FIG. 8A shows an imaging device corresponding to a reference image, and "Cam2" illustrated in FIG. 8A shows an imaging device corresponding to a switching destination image. Moreover, "Cam3" illustrated in FIG. 8A shows an imaging device which is located on virtual path P and is different from the imaging device corresponding to the reference image and the imaging device corresponding to the switching destination image. Moreover, "Cam3'" illustrated in FIG. 8A shows one example of a virtual imaging device located on virtual path P.

In A of FIG. 8A, imaging device Cam1 corresponding to the reference image and imaging device Cam2 corresponding to the switching destination image are located on virtual path P. Therefore, the information processing apparatus according to the present embodiment displays the reference image and the switching destination image at image switching.

Moreover, other imaging devices are located on virtual path P in A of FIG. 8A. Therefore, at image switching, the information processing apparatus according to the present embodiment displays the captured image basically captured by each imaging device, as a complement image.

However, in an captured image captured by imaging device Cam3 located on set virtual path P, subject O does not exist in the vicinity of the center of the image unlike captured images captured by other imaging devices. Therefore, in a case where the captured image captured by imaging device Cam3 at image switching is used as a complement image, for example, there is a risk that the user who sees the image recognizes that subject O shifts from the vicinity of the center and the image switching is not smooth.

Therefore, for example, by performing image processing on the captured image captured by imaging device Cam3, the information processing apparatus according to the present embodiment generates a generated image corresponding to a captured image captured by virtual imaging device Cam3' illustrated in B of FIG. 8A. For example, the information processing apparatus according to the present embodiment generates the generated image by performing cropping, rotation, affine transformation and homography transformation, and so on, on the captured image captured by imaging device Cam3.

Further, the information processing apparatus according to the present embodiment assumes the generated generated image as a complement image, instead of the captured image captured by imaging device Cam3.

For example, by generating the generated image as illustrated in FIG. 8A and displaying the generated image as a complement image, for example, it is possible to present a smoother image to the user at image switching. Moreover, by generating the generated image as illustrated in FIG. 8A and assuming the generated image as the complement image, it is possible to create a more beautiful image, for example, in a case where a plurality of captured images are displayed at the same time or a so-called time slice image is displayed.

FIG. 8B is an explanatory diagram to describe one example of the processing related to the information processing method according to the present embodiment and illustrates another example of the processing related to the display of an image corresponding to a virtual path in the display control processing according to the present embodiment. FIG. 8B illustrates a case where a plurality of imaging devices are not located on set virtual path P.

"Cam1" illustrated in FIG. 8B shows an imaging device corresponding to a reference image, and "Cam2" illustrated in FIG. 8B shows an imaging device corresponding to a switching destination image. Moreover, each of "Cam3", "Cam4" and "Cam5" illustrated in FIG. 8B shows an imaging device which is located on virtual path P and is different from the imaging device corresponding to the reference image and the imaging device corresponding to the switching destination image.

Moreover, each of "Cam1'", "Cam2'", "Cam3'", "Cam4'" and "Cam5'" illustrated in FIG. 8A shows one example of a virtual imaging device located on virtual path P.

In A of FIG. 8B, imaging device Cam1 corresponding to the reference image is not located on virtual path P. Here, the information processing apparatus according to the present embodiment determines whether the position of the imaging device corresponding to the reference image exists on the virtual path, for example, on the basis of the position of the imaging device corresponding to the reference image and the virtual path.

In a case where the position of the imaging device corresponding to the reference image does not exist on the virtual path as illustrated in A of FIG. 8B, the information processing apparatus according to the present embodiment generates an image based on the reference image by performing image processing such that the reference image becomes an image corresponding to the captured image captured by virtual imaging device Cam1' located on the virtual path. The image based on the reference image to be generated corresponds to the captured image captured by virtual imaging device Cam1'. The information processing apparatus according to the present embodiment generates the image based on the reference image, for example, by performing scale transformation and affine transformation, and so on, on the captured image captured by imaging device Cam1.

Further, the information processing apparatus according to the present embodiment displays the generated image based on the reference image at image switching.

Moreover, in a case where the position of the imaging device corresponding to the switching destination image does not exist on the virtual path as illustrated in A of FIG. 8B, the information processing apparatus according to the present embodiment generates an image based on the switching destination image by performing image processing such that the switching destination image becomes an image corresponding to a captured image captured by virtual imaging device Cam2' located on the virtual path. The image based on the switching destination image to be generated corresponds to the captured image captured by virtual imaging device Cam2'. The information processing apparatus according to the present embodiment generates the image based on the switching destination image, for example, by performing scale transformation and affine transformation, and so on, on the captured image captured by imaging device Cam2.

Further, the information processing apparatus according to the present embodiment displays the generated image based on the switching destination image at image switching.

Moreover, in a case where the positions of other imaging devices Cam3 to Cam5 than the imaging device corresponding to the reference image and the imaging device corresponding to the switching destination image do not exist on the virtual path as illustrated in A of FIG. 8B, the information processing apparatus according to the present embodiment generates generated images by performing image processing such that captured images captured by other imaging devices Cam3 to Cam5 become images corresponding to captured images captured by virtual imaging devices Cam3' to Cam5' located on the virtual path. The generated images to be generated correspond to the captured images captured by virtual imaging devices Cam3' to Cam5'. The information processing apparatus according to the present embodiment generates the generated images, for example, by performing scale transformation and affine transformation, and so on, on the captured images captured by imaging devices Cam3 to Cam5.

Further, the information processing apparatus according to the present embodiment displays the generated generated images as complement images at image switching.

For example, by displaying the image based on the reference image and the image based on the switching destination image instead of the reference image and the switching destination image and displaying the generated images as complement images as illustrated in FIG. 8B, for example, it is possible to present a smoother image to the user at image switching. Moreover, by generating the image based on the reference image and the image based on the switching destination image, generating the generated images and assuming the generated images as complement images as illustrated in FIG. 8B, for example, it is possible to create a more beautiful image in a case where a plurality of captured images are displayed at the same time or in a case where a so-called time slice image is displayed.

The information processing apparatus according to the present embodiment performs processing as illustrated with reference to FIG. 8A and FIG. 8B, for example, as processing related to the display of an image corresponding to a set virtual path.

Here, an example of the processing related to the display of the image corresponding to the set virtual path is not limited to the processing illustrated with reference to FIG. 8A and FIG. 8B.

For example, the information processing apparatus according to the present embodiment can also display an image focusing on a predetermined subject at image switching.

FIG. 9 is an explanatory diagram to describe one example of the processing related to the information processing method according to the present embodiment and illustrates another example of the processing related to the display of the image corresponding to the virtual path in the display control processing according to the present embodiment.

A1 to A4 illustrated in FIG. 9 show one example of captured images captured by a plurality of imaging devices. Moreover, B1 to B4 illustrated in FIG. 9 illustrate one example of images focusing on a catcher (one example of a predetermined subject) included in images after processing similar to the processing illustrated with reference to FIG. 8A and FIG. 8B is performed on each captured image of A1 to A4 of FIG. 9.

For example, by detecting the predetermined subject from the images and performing image processing such that the detected predetermined subject is focused, the information processing apparatus according to the present embodiment generates the images illustrated in B1 to B4 of FIG. 9 as generated images. For example, the information processing apparatus according to the present embodiment detects a subject from an image (for example, a reference image, a switching destination image and a complement image, and so on) by the use of data showing the feature of the predetermined subject acquired as a result of learning by a method illustrated with reference to FIG. 5A to FIG. 5C.

When images focusing on a predetermined subject are generated as generated images and displayed as illustrated in B1 to B4 of FIG. 9, it is possible to present the images in which the display position of the predetermined subject smoothly changes, to the user. Moreover, for example, when the images focusing on the predetermined subject are generated as generated images as illustrated in B1 to B4 of FIG. 9, for example, it is possible to create a more beautiful image in a case where a plurality of captured images are displayed at the same time or in a case where a so-called time slice image is displayed.

(2-3) Third Example of Display Control Processing According to Present Embodiment: Another Example of Processing Related to Display of Image Corresponding to Set Virtual Path A virtual path may be set on the basis of a user operation as described above. Moreover, the information processing apparatus according to the present embodiment can also adaptively decide whether to use a captured image captured by an imaging device at image switching, for example, on the basis of the position (spatial disposition) of the imaging device, the existence/non-existence of a subject included in the captured image and the position of the subject included in the captured image.

FIG. 10 is an explanatory diagram to describe one example of processing related to the information processing method according to the present embodiment and illustrates another example of processing related to the display of an image corresponding to a virtual path in the display control processing according to the present embodiment.

A1, B1 and C1 illustrated in FIG. 10 show one example of captured images captured by one imaging device located on a virtual path. Moreover, A3 and B3 illustrated in FIG. 10 show one example of captured images captured by another imaging device located on the virtual path. Moreover, C3 illustrated in FIG. 10 shows one example of a complement image and shows a generated image generated by cropping the captured images captured by above-described other imaging devices located on the virtual path. Moreover, A2, B2 and C2 illustrated in FIG. 10 show one example of complement images and show generated images respectively.

When one imaging device and another imaging device are located on the virtual path, in the case of switching from an image of a viewpoint corresponding to one imaging device to an image of a viewpoint corresponding to another imaging device, for example, the information processing apparatus according to the present embodiment displays the complement images illustrated in A2 and B2 of FIG. 10 according to a set virtual path before the images illustrated in A3 and B3 of FIG. 10 are displayed. Here, the switching of the images illustrated in A1, A2 and A3 of FIG. 10 can be interpreted as the switching of virtual-path-based images, for example. Moreover, the switching of the images illustrated in A1, A2 and A3 of FIG. 10 can be interpreted as the switching of subject-based images, for example.

Moreover, for example, as illustrated in C1, C2 and C3 of FIG. 10, the information processing apparatus according to the present embodiment can also switch images such that the position in which a subject is displayed and the size of the subject do not change. For example, as illustrated in C1, C2 and C3 of FIG. 10, in a case where images are switched such that the position in which the subject is displayed and the size of the subject do not change, the user can see the images intuitively and edit the images more intuitively. For example, the switching of the images illustrated in C1, C2 and C3 of FIG. 10 can be interpreted as the switching of subject-based images.

For example, smoother image switching is realized by performing image switching as illustrated in FIG. 10.

(2-4) Fourth Example of Display Control Processing According to Present Embodiment FIG. 11A and FIG. 11B are explanatory diagrams to describe one example of processing related to the information processing method according to the present embodiment and illustrate one example of image switching realized by the display control processing according to the present embodiment. The examples illustrated in FIG. 11A and FIG. 11B show examples in a case where switching is performed from an captured image captured by imaging device Cam1 to an captured image captured by imaging device Cam4 when imaging is performed by a plurality of imaging devices Cam1 and Cam2, and so on, disposed in the baseball stadium.

A of FIG. 11A illustrates one example of an captured image captured by imaging device Cam1 and is an image currently displayed on a display screen, for example. In the examples illustrated in FIG. 11A and FIG. 11B, the captured image captured by imaging device Cam1 corresponds to a reference image.

Moreover, B of FIG. 11A illustrates one example of an captured image captured by imaging device Cam2, an captured image captured by imaging device Cam3, an captured image captured by imaging device Cam4 and an captured image captured by imaging device Cam5, and so on, in order from the left of FIG. 11A. In the examples illustrated in FIG. 11A and FIG. 11B, the captured image captured by imaging device Cam4 corresponds to a reference image.

Virtual path P related to image switching from the reference image to the switching destination image is set so as to go through imaging devices Cam2 and Cam3 located between imaging device Cam1 corresponding to the reference image and imaging device Cam4 corresponding to the switching destination image as illustrated in A of FIG. 11B, for example. For example, by setting virtual path P as illustrated in A of FIG. 11B, it is possible to use the captured images captured by imaging devices Cam2 and Cam3 as complement images. Here, as described above, the virtual path according to the present embodiment can be arbitrary set on the basis of, for example, a user operation, and so on.

Moreover, at image switching from the reference image to the switching destination image, generated images corresponding to the captured images captured by virtual imaging devices VD1 to VD3 on the virtual path may be supplemented as complement images as illustrated in B of FIG. 11B, for example. For example, the number of complement images is decided depending on the distance between imaging device Cam1 corresponding to the reference image and imaging device Cam2 corresponding to the switching destination image.

For example, when the captured images captured by imaging devices Cam2 and Cam3 and the generated images corresponding to the captured images captured by virtual imaging devices VD1 to VD3 are supplemented as complement images as illustrated in B of FIG. 11B, image switching as illustrated in C of FIG. 11 is realized.

(2-5) Fifth Example of Display Control Processing According to Present Embodiment: Example of UI (User Interface) According to Image Switching For example, as illustrated with reference to A of FIG. 4, image switching according to the present embodiment may be performed on the basis of a user operation with respect to an operation screen in which the user can perform an operation related to the image switching.

FIG. 12 is an explanatory diagram to describe one example of processing related to the information processing method according to the present embodiment and illustrates one example of a UI related to the image switching according to the present embodiment. A of FIG. 12 illustrates one example of an operation screen in which the user can perform an operation related to image switching, and B of FIG. 12 illustrates another example of the operation screen in which the user can perform an operation related to image switching.

(2-5-1) First Example of Operation Screen (A of FIG. 12)

Referring to A of FIG. 12, the operation screen according to the first example includes main image display region V in which an image is displayed, and selection region S1 in which captured images arranged in the processing of above (1) (rearrangement processing) are displayed and the user can perform an operation to select an captured image. Here, the operation with respect to selection region S1 corresponds to one example of an operation related to the image switching according to the present embodiment. Moreover, the operation screen according to the present embodiment may include an operation button related to the reproduction of images and a seek bar, and so on.

The captured image displayed on main image display region V corresponds to a reference image. Moreover, captured images captured by other imaging devices than the imaging device corresponding to the reference image are displayed in selection region S1, for example, according to the positional relationship with the imaging device corresponding to the reference image (captured image displayed in main image display region V). The captured images captured by other imaging devices are displayed in selection region S1 in order from the one having the closest distance to the imaging device corresponding to the reference image, in the arrangement direction related to the processing of above (1) (rearrangement processing), for example. In a case where an captured image displayed in main image display region V changes to another image, an image corresponding to the image displayed in main image display region V is displayed in selection region S1.

In a case where a user operation is performed for the operation screen illustrated in A of FIG. 12, when the user selects an image displayed in selection region S1, the information processing apparatus according to the present embodiment switches images from the captured image displayed in main image display region V to the image captured image selected in selection region S1.

(2-5-2) Second Example of Operation Screen (B of FIG. 12)

Referring to B of FIG. 12, the operation screen according to the second example includes main image display region V in which an image is displayed, and selection region S2 in which the positions of imaging devices corresponding to captured images arranged in the processing of above (1) are displayed and in which the user can perform an operation related to selection. Here, the operation with respect to selection region S2 corresponds to one example of an operation related to the image switching according to the present embodiment. Similar to A of FIG. 12, the captured image displayed in main image display region V corresponds to a reference image.

Examples of the operation related to user's selection with respect to selection region S2 include an operation to select an imaging device and an operation to set a virtual path. For example, the operation to select the imaging device corresponds to a selection operation of a switching destination image, which selects an captured image corresponding to the selected imaging device as the switching destination image. Moreover, for example, the operation to set the virtual path corresponds to a selection operation of the switching destination image according to the setting of the virtual path.

Moreover, in selection region S2, for example, as illustrated in I of B of FIG. 12, an imaging device corresponding to an captured image displayed in main image display region V may be clearly shown by "giving colors to the imaging device corresponding to the captured image displayed in main image display region V", "performing display such that the size of the imaging device corresponding to the captured image displayed on main image display region V is larger than other imaging devices" and "fixing characters to the imaging device corresponding to the captured image displayed in main image display region V", and so on.

In a case where a user operation is performed for the operation screen illustrated in B of FIG. 12, when the user selects an imaging device displayed in selection region S2, the information processing apparatus according to the present embodiment switches images from the captured image displayed in main image display region V to an captured image captured by the imaging device selected in selection region S2. Moreover, in a case where the user operation is performed for the operation screen illustrated in B of FIG. 12, for example, when the user sets a virtual path, the information processing apparatus according to the present embodiment switches images from the captured image displayed in main image display region V to an image corresponding to the terminal of the virtual path set in selection region S2.

For example, the information processing apparatus according to the present embodiment performs display control processing on the basis of the user operation with respect to the operation screen illustrated in FIG. 12, and switches and displays images. Here, it is needless to say that a UI related to the image switching according to the present embodiment is not limited to the operation screen illustrated in FIG. 12.

<3> Specific Example of Processing Related to Information Processing Method According to Present Embodiment FIG. 13 is a flowchart illustrating one example of processing related to the information processing method according to the present embodiment. In FIG. 13, for example, processing illustrated in B of FIG. 13 corresponds to one example of the processing of above (2) (display control processing). Moreover, the processing of above (1) (rearrangement processing) is omitted in FIG. 13.

Moreover, the processing in steps S100 to S108 illustrated in A of FIG. 13 shows one example of pre-processing performed before images are switched and displayed in the processing of above (2) (display control processing). Here, the processing in steps S100 to S108 illustrated in A of FIG. 13 is not limited to the pre-processing, and may be real-time processing performed between processing in steps S200 and S202 illustrated in B of FIG. 13.

First, referring to A of FIG. 13, the information processing apparatus according to the present embodiment estimates the position of an imaging device (S100). For example, the information processing apparatus according to the present embodiment estimates the position of the imaging device by an captured image and sensor information acquired from a sensor such as a GPS device.

The information processing apparatus according to the present embodiment detects a subject from an captured image (S102). For example, the information processing apparatus according to the present embodiment detects the subject from the captured image by the use of data showing the feature of a predetermined subject acquired as a result of learning by a method illustrated with reference to FIG. 5A to FIG. 5C, and so on.

The information processing apparatus according to the present embodiment corrects the color tone of the captured image (S104).

The information processing apparatus according to the present embodiment estimates a virtual path and determines the use of the captured image (S106).

FIG. 14 is a flowchart illustrating one example of processing related to the information processing method according to the present embodiment and illustrates one example of the processing in step S106 of A of FIG. 13. Moreover, FIG. 15 is an explanatory diagram to describe the processing related to the information processing method according to the present embodiment, and A and B illustrated in FIG. 15 illustrate diagrams to supplement the processing illustrated in FIG. 14.

The information processing apparatus according to the present embodiment excludes an captured image designated by the user (S300). Moreover, the information processing apparatus according to the present embodiment excludes an captured image in which a predetermined subject is not included (S302). Moreover, the information processing apparatus according to the present embodiment excludes an captured image with greatly different colors from other captured images (S304). Moreover, the information processing apparatus according to the present embodiment excludes an captured image with greatly different resolution from other captured images (S306).

By performing the processing in steps S300 to S306, for example, an captured image without a predetermined subject like an captured image captured by imaging device Cam1 illustrated in A of FIG. 15 and an captured image with insufficient resolution like an captured image captured by imaging device Cam2 illustrated in A of FIG. 15 are excluded. Here, it is also possible that the information processing apparatus according to the present embodiment does not perform the processing in steps S300 to S306.

The information processing apparatus according to the present embodiment generates a virtual path (S308). For example, the information processing apparatus according to the present embodiment generates a virtual path that goes through other imaging devices located between an imaging device corresponding to a reference image and an imaging device corresponding to a switching destination image. Here, in a case where an captured image is excluded in the processing in step S312 described later and processing in step S308 is performed again, for example, the information processing apparatus according to the present embodiment generates a virtual path that does not go through an imaging device corresponding to the excluded captured image again.

The information processing apparatus according to the present embodiment evaluates the set virtual path (S310) and excludes an image that does not suit the virtual path (S312). For example, the exclusion of the image that does not suit the virtual path is performed every one image.

For example, the information processing apparatus according to the present embodiment determines whether the image that does not suit the virtual path exists in the set virtual path, and evaluates the virtual path.

When a specific example is cited, for example, the information processing apparatus according to the present embodiment determines whether an captured image captured by an imaging device located on the virtual path corresponds to one or two or more of the following cases, calculates the evaluation value of each captured image and evaluates the virtual path by the evaluation value. For example, the information processing apparatus according to the present embodiment may evaluate the virtual path by assuming the sum of values respectively corresponding to the following cases as an evaluation value, or may evaluate the virtual path by combining a plurality of evaluation values by assuming the values corresponding to respective cases as evaluation values and using the plurality of evaluation values in series. Here, it is needless to say that a calculation method of the evaluation value is not limited to the method of determining whether it corresponds to one or two or more of the following cases.

Case where posture/position of imaging device is shifted (for example, case where distance up to virtual path is equal to or greater than threshold or case where it is not vertical to virtual path)
  Case where virtual path generated when target captured image is excluded is extremely short
  Case where virtual path generated when target captured image is excluded is smooth For example, the information processing apparatus according to the present embodiment determines an image that does not suit the virtual path by performing threshold processing by the use of the evaluation value calculated in step S310 and a threshold, and excludes the image determined not to suit the virtual path in step S312.

Here, for example, the information processing apparatus according to the present embodiment can also determine an image that does not suit the virtual path, by a determination criterion that a predetermined subject is not included in an captured image or the colors thereof are greatly different from other captured images. In stages of the processing in steps S308 to S312, in a case where a determination of the image that does not suit the virtual path is made by the determination criterion that the predetermined subject is not included in the captured image, and so on, the information processing apparatus according to the present embodiment does not have to perform the processing in steps S300 to S306.

For example, an imaging device like imaging device Cam3 illustrated in B of FIG. 15 is excluded by performing the processing in steps in S308 to S312.

The information processing apparatus according to the present embodiment determines whether there is an image that can be excluded among captured images captured by other imaging devices located between an imaging device corresponding to a reference image and an imaging device corresponding to a switching destination image (S314). For example, in a case where the captured image determined not to suit the virtual path in step S310 does not exist besides the captured image excluded in step S312, the information processing apparatus according to the present embodiment determines that there is no image that can be excluded.

In a case where it is not determined that there is no image that can be excluded in step S314, the information processing apparatus according to the present embodiment repeats the processing from step S308. Moreover, in a case where it is determined that there is no image that can be excluded in step S314, the information processing apparatus according to the present embodiment ends the processing in step S106 of A of FIG. 13.

For example, the processing illustrated in FIG. 14 is performed in step S106 of A of FIG. 13. Here, it is needless to say that the processing in step S106 of A of FIG. 13 is not limited to the processing illustrated in FIG. 14.

One example of processing related to the information processing method according to the present embodiment is described with reference to A of FIG. 13 again. The information processing apparatus according to the present embodiment generates three-dimensional information (data showing the depth) from an captured image (S108). Here, the three-dimensional information generated in step S108 is used to generate a generated image (one example of a complement image).

For example, the information processing apparatus according to the present embodiment performs the processing illustrated in A of FIG. 13 as a pre-processing in the processing related to the information processing method according to the present embodiment.

Here, the pre-processing according to the present embodiment is not limited to the example illustrated in A of FIG. 13. For example, the information processing apparatus according to the present embodiment may not perform one or both of the processing in step S104 and the processing in step S108.

Moreover, as described above, the processing illustrated in A of FIG. 13 (including processing according to a modification example of A of FIG. 13 described above) is not limited to the pre-processing, and it may be performed between the processing in steps S200 and S202 illustrated in B of FIG. 13.

Next, referring to B of FIG. 13, the information processing apparatus according to the present embodiment determines whether a switching destination viewpoint (switching destination image) is selected (S200). For example, in a case where a user operation related to the selection of the switching destination image with respect to the operation screen illustrated in FIG. 12 is detected, the information processing apparatus according to the present embodiment determines that the switching destination viewpoint is selected.

In a case where it is not determined that the switching destination viewpoint is selected in step S200, the information processing apparatus according to the present embodiment does not advance processing until the switching destination viewpoint is determined to be selected.

Moreover, in a case where it is determined that the switching destination viewpoint is selected in step S200, the information processing apparatus according to the present embodiment selectively supplements one or two or more complement images (S202) and switches images from the reference image to the switching destination image and displays it (S204). The information processing apparatus according to the present embodiment supplements a generated image generated by various kinds of rendering and various kinds of transformation, and so on, as a complement image, so as to correspond to an captured image captured by an imaging device located on a virtual path and an captured image captured by a virtual imaging device located on the virtual path.

For example, by performing the processing illustrated in B of FIG. 13, smoother image switching from the reference image to the switching destination image is realized.

For example, the information processing apparatus according to the present embodiment performs the processing illustrated in A of FIG. 13 and B of FIG. 13 as the processing related to the information processing method according to the present embodiment. Here, it is needless to say that the processing related to the information processing method according to the present embodiment is not limited to the processing illustrated in A of FIG. 13 and B of FIG. 13.

(Information Processing Apparatus According to Present Embodiment)

Next, one example of the configuration of the information processing apparatus according to the present embodiment that can perform the above-described processing related to the information processing method according to the present embodiment is described. In the following, the configuration of the information processing apparatus according to the present embodiment in a case where the processing of above (1) (rearrangement processing) and the processing of above (2) (display control processing) are performed is exemplified as the processing related to the information processing method according to the present embodiment.

FIG. 16 is a block diagram illustrating one example of the configuration of an information processing apparatus 100 according to the present embodiment. For example, the information processing apparatus 100 includes a communication unit 102 and a control unit 104.

Moreover, for example, the information processing apparatus 100 may include a read only memory (ROM, which is not illustrated), a random access memory (RAM, which is not illustrated), a storage unit (not illustrated), an operation unit (not illustrated) that can be operated by the user, and a display unit (not illustrated) that displays various screens on a display screen. For example, the information processing apparatus 100 connects the above-described components by a bus as a data transmission path.

The ROM (not illustrated) stores control data such as a program and an operation parameter used by the control unit 104. The RAM (not illustrated) temporarily stores a program, and so on, executed by the control unit 104.

The storage unit (not illustrated) is storage means included in the information processing apparatus 100, and, for example, stores various kinds of data like various applications and data related to the information processing method according to the present embodiment such as data showing the feature of a subject. Here, examples of the storage unit (not illustrated) include a magnetic recording medium such as a hard disk, and a nonvolatile memory such as a flash memory. Moreover, the storage unit (not illustrated) may be detachable from the information processing apparatus 100.

As the operation unit (not illustrated), an operation input device described later is cited. Moreover, as the display unit (not illustrated), a display device described later is cited.

(Hardware Configuration Example of Information Processing Apparatus 100)

FIG. 17 is an explanatory diagram illustrating one example of the hardware configuration of the information processing apparatus 100 according to the present embodiment. For example, the information processing apparatus 100 includes an MPU 150, a ROM 152, a RAM 154, a recording medium 156, an input/output interface 158, an operation input device 160, a display device 162 and a communication interface 164. Moreover, for example, the information processing apparatus 100 connects each component by a bus 166 as a data transmission path.

For example, the MPU 150 includes one or two or more processors and various processing circuits, which include an operation circuit such as a micro processing unit (MPU), and functions as the control unit 104 that controls the whole of the information processing apparatus 100. Moreover, for example, the MPU 150 plays the roles of a rearrangement unit 110 and a display control unit 112 described later, in the information processing apparatus 100.

The ROM 152 stores control data such as a program and an operation parameter used by the MPU 150. For example, the RAM 154 temporarily stores a program or the like executed by the MPU 150.

The recording medium 156 functions as a storage unit (not illustrates), and, for example, stores various kinds of data like various applications and data related to the information processing method according to the present embodiment, such as data showing the feature of a subject. Here, examples of the recording medium 156 include a magnetic recording medium such as a hard disk and a nonvolatile memory such as a flash memory. Moreover, the recording medium 156 may be detachable from the information processing apparatus 100.

For example, the input/output interface 158 performs connection with the operation input device 160 and the display device 162. The operation input device 160 functions as an operation unit (not illustrated), and the display device 162 functions as a display unit (not illustrated). Here, examples of the input/output interface 158 include a universal serial bus (USB) terminal, a digital visual interface (DVI) terminal, a high-definition multimedia interface (HDMI) (registered trademark) terminal and various processing circuits, and so on.

Moreover, for example, the operation input device 160 is installed on the information processing apparatus 100 and connected with the input/output interface 158 in the information processing apparatus 100. Examples of the operation input device 160 include a button, a direction key and a rotation type selector such as a jog dial, or a combination of these.

Moreover, for example, the display device 162 is installed on the information processing apparatus 100 and connected with the input/output interface 158 in the information processing apparatus 100. Examples of the display device 162 include a liquid crystal display and an organic electroluminescence display (organic EL display, which is also called an organic light emitting diode display (OLED display)).

Here, it is needless to say that the input/output interface 158 can also be connected with external devices such as an external operation input device (for example, a keyboard and a mouse, and so on) and an external display device as an external apparatus of the information processing apparatus 100. Moreover, for example, the display device 162 may be a device in which display and a user operation are possible, such as a touch panel.

The communication interface 164 is communication means included in the information processing apparatus 100, and functions as the communication unit 102 to perform wireless or wire communication with external devices such as an external imaging device and an external display device through a network (or directly). Here, examples of the communication interface 164 include a communication antenna and a radio frequency (RF) circuit (wireless communication), an IEEE 802.15.1 port and a transmission and reception circuit (wireless communication), an IEEE 802.11 port and a transmission and reception circuit (wireless communication), and a local area network (LAN) terminal and a transmission and reception circuit (wire communication), and so on. Moreover, examples of the network according to the present embodiment include a wire network such as a LAN and a wide area network (WAN), a wireless network such as a wireless LAN (wireless local area network: WLAN), and the Internet using a communication protocol such as a transmission control protocol/internet protocol (TCP/IP).

The information processing apparatus 100 performs processing related to the information processing method according to the present embodiment, for example, by the configuration illustrated in FIG. 17. Here, the hardware configuration of the information processing apparatus 100 according to the present embodiment is not limited to the configuration illustrated in FIG. 17.

For example, the information processing apparatus 100 may not include the communication interface 164 in the case of performing communication with an external apparatus through a connected external communication device.

Moreover, the information processing apparatus 100 may further include an imaging device that functions as an imaging unit (not illustrated) that generates an captured image by imaging.

Moreover, for example, the information processing apparatus 100 can also adopt a configuration without the recording medium 156, the operation input device 160 and the display device 162.

One example of the configuration of the information processing apparatus 100 is described with reference to FIG. 16 again. The communication unit 102 is communication means included in the information processing apparatus 100, and performs wireless or wire communication with external devices such as an external imaging device, and an external apparatus through a network (or directly). Moreover, in the communication unit 102, communication is controlled by the control unit 104, for example.

Here, examples of the communication unit 102 include a communication antenna and an RF circuit, and a LAN terminal and a transmission and reception circuit, but the configuration of the communication unit 102 is not limited to the above. For example, the communication unit 102 can adopt a configuration corresponding to an arbitrary standard in which it is possible to perform communication such as a USB terminal and a transmission and reception circuit, and an arbitrary configuration in which it is possible to perform communication with an external apparatus through a network. Moreover, the communication unit 102 may adopt a configuration in which it is possible to perform communication with one or two or more external apparatuses in a plurality of communication schemes.

For example, the control unit 104 may include an MPU, and so on, and plays a role to control the whole of the information processing apparatus 100. Moreover, for example, the control unit 104 includes the rearrangement unit 110 and the display control unit 112, and plays a role to initiatively perform processing related to the information processing method according to the present embodiment.

The rearrangement unit 110 plays a role to initiatively perform the processing of above (1) (rearrangement processing) and arranges a plurality of captured images generated by simultaneous imaging by a plurality of imaging devices located in a predetermined region, on the basis of the positional relationship between the plurality of imaging devices.

Moreover, the rearrangement unit 110 may arrange a plurality of images while excluding an captured image from the plurality of captured images as shown above (a) to (f), for example.

The display control unit 112 plays a role to initiatively perform the processing of above (2) (display control processing). For example, by displaying a plurality of captured images according to the arrangement order of the plurality of captured images arranged by the rearrangement unit 110, the display control unit 112 displays a plurality of captured images in a mode corresponding to the positional relationship between the plurality of imaging devices. Moreover, the display control unit 112 switches images from a reference image to a switching destination image and displays it.

The display control unit 112 selectively supplements one or two or more complement images on the basis of the positional relationship between an imaging device corresponding to the reference image and an imaging device corresponding to the switching destination image. Further, in a case where a complement image is supplemented, the display control unit 112 displays the complement image before displaying the switching destination image.

Moreover, in the case of switching and displaying images, the display control unit 112 may display images (for example, a reference image, an image based the reference image, a complement image, a switching image and an image based on the switching image) corresponding to a set virtual path. Specifically, the display control unit 112 selectively displays the image based on the reference image as an image corresponding to the virtual path instead of the reference image, for example, on the basis of the position of an imaging device corresponding to the reference image and the virtual path. Moreover, the display control unit 112 selectively displays the image based on the switching image as an image corresponding to the virtual path instead of the switching image, for example, on the basis of the position of an imaging device corresponding to the switching image and the virtual path. Moreover, for example, the display control unit 112 supplements an image corresponding to the virtual path as a complement image and displays the supplemented complement image.

For example, the display control unit 112 performs one or two or more pieces of processing among the processing according to the first example shown in above (2-1) to the processing according to the fifth example shown in above (2-5).

For example, by including the rearrangement unit 110 and the display control unit 112, the control unit 104 initiatively performs processing related to the information processing method according to the present embodiment.

The information processing apparatus 100 performs processing related to the information processing method according to the present embodiment (for example, the processing of above (1) (rearrangement processing) and the processing of above (2) (display control processing)), for example, by the configuration illustrated in FIG. 16.

Therefore, the information processing apparatus 100 can achieve the improvement of user's convenience related to the switching of captured images, for example, by the configuration illustrated in FIG. 16.

Moreover, the information processing apparatus 100 can provide an effect provided by performing processing related to the information processing method according to the present embodiment, for example, by the configuration illustrated in FIG. 16.

Here, the configuration of the information processing apparatus according to the present embodiment is not limited to the configuration illustrated in FIG. 16.

For example, the information processing apparatus according to the present embodiment can include one or both of the rearrangement unit 110 and the display control unit 112 illustrated in FIG. 16 separately from the control unit 104 (for example, realize them by different processing circuits).

Moreover, as described above, the processing of above (1) (rearrangement processing) and the processing of above (2) (display control processing) are ones obtained by dividing the processing related to the information processing method according to the present embodiment for convenience' sake. Therefore, a configuration to realize the processing related to the information processing method according to the present embodiment is not limited to the rearrangement unit 110 and the display control unit 112 illustrated in FIG. 16, and it is possible to adopt a configuration corresponding to a way of dividing the processing related to the information processing method according to the present embodiment.

Moreover, for example, in the case of performing communication with an external apparatus through an external communication device having a function and configuration similar to the communication unit 102, the information processing apparatus according to the present embodiment may not include the communication unit 102.

Moreover, the information processing apparatus according to the present embodiment can also adopt a configuration without the rearrangement unit 110 illustrated in FIG. 16. Since the information processing apparatus according to the present embodiment can perform the processing of above (2) even in a case where it adopts the configuration without the rearrangement unit 110 (display control processing), it is possible to achieve the improvement of user's convenience related to the switching of captured images.

Moreover, the information processing apparatus according to the present embodiment may include an imaging device and further include an imaging unit (not illustrated) that generates a captured image by imaging.

The present embodiment is described above using an information processing apparatus as an example, but the present embodiment is not limited to such a mode. For example, the present embodiment is applicable to various kinds of equipment such as computers including a personal computer (PC) and a server, imaging apparatuses including a digital still camera and a digital video camera, communication apparatuses including a mobile phone and a smart phone, a tablet-type apparatus, a display apparatus, an image/music reproduction apparatus (or image/music recording and reproduction apparatus) and a game machine. Moreover, for example, the present embodiment is applicable to a processing integrated circuit (IC) that can be built into the equipment described above.

Moreover, the information processing apparatus according to the present embodiment may be realized by a system including a plurality of apparatuses assuming connection with a network (or communication between apparatuses), for example, like cloud computing. That is, it is also possible to realize the information processing apparatus according to the present embodiment described above, for example, as the system including the plurality of devices.

For example, in a case where the information processing apparatus according to the present embodiment described above is realized as a system such as cloud computing, for example, the system according to the present embodiment performs processing related to the information processing method according to the present embodiment and displays an image to be switched on a display screen of an apparatus (for example, an apparatus or the like owned by the user) that can perform wire or wireless communication. Here, even if the information processing apparatus according to the present embodiment described above is not the system including the plurality of devices but is one apparatus, the information processing apparatus according to the present embodiment can perform processing related to the information processing method according to the present embodiment and display an image to be switched on the display screen of the apparatus that can perform wire or wireless communication.

(Program According to Present Embodiment)

When a program (for example, a program that can execute processing related to the information processing method according to the present embodiment such as the processing of above (1) (rearrangement processing) and the processing of above (2) (display control processing), and so on) that causes a computer to function as the information processing apparatus according to the present embodiment is executed by a processor or the like in the computer, it is possible to achieve the improvement of user's convenience related to the switching of captured images.

Moreover, when a program that causes a computer to function as the information processing apparatus according to the present embodiment is executed by a processor or the like in the computer, it is possible to provide an effect provided by the processing related to the information processing method according to the present embodiment described above.

It should be understood by those skilled in the art that various modifications, combinations, sub-combinations and alterations may occur depending on design requirements and other factors insofar as they are within the scope of the appended claims or the equivalents thereof.

For example, it has been illustrated above that a program (computer program) that causes a computer to function as the information processing apparatus according to the present embodiment is provided, but the present embodiment can further provide a recording medium in which the above-described program is stored together.

The above-described configurations express examples of the present embodiment and, of course, pertain to the technical scope of the present disclosure.

In addition, the effects described in the present specification are merely illustrative and demonstrative, and not limitative. In other words, the technique according to the present disclosure can exhibit other effects that are evident to those skilled in the art along with or instead of the effects based on the present specification.

(1) An information processing apparatus including: circuitry configured to connect a reference image and a target image with at least one of a plurality of complement images based on a reference viewpoint of a subject and a target viewpoint of the subject in response to an identification of the target viewpoint, wherein each of the plurality of complement images corresponds to a complementary viewpoint of the subject between the reference viewpoint and the target viewpoint.

(2) The information processing apparatus of (1), wherein the circuitry is configured to receive the identification of the target viewpoint based upon a display corresponding to the target viewpoint on a display screen.

(3) The information processing apparatus of (1) or (2), wherein the at least one of the plurality of complement images is a captured image.

(4) The information processing apparatus of (1) to (3), wherein the circuitry is configured to set a virtual path from the reference viewpoint to the target viewpoint.

(5) The information processing apparatus of (1) to (4), wherein the at least one of the plurality of complement images is an interpolation image, which is an image corresponding to a virtual viewpoint along the virtual path.

(6) The information processing apparatus of (1) to (5), wherein the circuitry is configured to perform image processing on the image for at least one of the plurality of complement images, the reference image and the target image according to the virtual path.

(7) The information processing apparatus of (1) to (6), wherein the at least one of the plurality of complement images is combination of a captured image and an interpolation image, which corresponds to a virtual viewpoint along the virtual path. (8) The information processing apparatus of (1) to (7), wherein the plurality of complement images includes a plurality of interpolation images that are images respectively corresponding to virtual viewpoints along a virtual path between the reference viewpoint and the target viewpoint.

(9) The information processing apparatus of (1) to (8), wherein the plurality of complement images includes a plurality of interpolation images and a plurality of captured images that repeatedly alternate with each other.

(10) The information processing apparatus of (1) to (9), wherein the display screen includes a main image display region and a selection region that includes the display corresponding to the target viewpoint.

(11) The information processing apparatus of (1) to (10), wherein the selection region displays a plurality of captured images respectively corresponding to a plurality of selectable target viewpoints.

(12) The information processing apparatus of (1) to (10), wherein the selection region displays a plurality of complementary viewpoints as a plurality of selectable target viewpoints.

(13) The information processing apparatus of (1) to (11), wherein the circuitry is configured to receive a selection of one of the plurality of captured images as the target viewpoint.

(14) The information processing apparatus of (1) to (12), wherein the circuitry is configured to receive a selection of one of the plurality of complementary viewpoints as the target viewpoint.

(15) The information processing apparatus of (1) to (14), wherein the plurality of captured images are respectively captured at different viewpoints simultaneously.

(16) The information processing apparatus of (1) to (15), wherein the plurality of interpolation images are generated at a different time from the plurality of captured images.

(17) The information processing apparatus of (1) to (16), wherein the plurality of complement images along with the reference image and the target image form a video data.

(18) The information processing apparatus of (1) to (17), wherein the image is a generated image.

(19) The information processing apparatus of (1) to (18), wherein the images are generated images.

(20) A method of operating an information processing apparatus including: connecting at least one of a plurality of complement images between a reference image and a target image based on a reference viewpoint of a subject and a target viewpoint of the subject in response to an identification of the target viewpoint, wherein each of the plurality of complement images corresponds to a complementary viewpoint of the subject between the reference viewpoint and the target viewpoint.

(21) The method of (20), wherein the connecting includes combining the plurality of complement images.

(22) A non-transitory computer readable medium storing a program for controlling an information processing apparatus including circuitry, the program being executable to perform operations including: connecting at least one of a plurality of complement images between a reference image and a target image based on a reference viewpoint of a subject and a target viewpoint of the subject in response to an identification of the target viewpoint, wherein each of the plurality of complement images corresponds to a complementary viewpoint of the subject between the reference viewpoint and the target viewpoint.

REFERENCE SIGNS LIST 10 lens
12 imaging element
14 signal processing circuit
100 information processing apparatus
102 communication unit
104 control unit
110 rearrangement unit
112 display control unit

The invention claimed is:

1. An information processing apparatus, comprising:
circuitry configured to:
 select a reference image from a plurality of images based on a first user operation, wherein
  the reference image is captured by a reference imaging device of a plurality of imaging devices, and
  the reference image includes a subject;
 select a target image from the plurality of images based on a second user operation, wherein
  the target image is captured by a target imaging device of the plurality of imaging devices, and
  the target image includes the subject;
 set a virtual path from a reference viewpoint associated with the reference image to a target viewpoint associated with the target image;
 determine a count of a plurality of complement images based on a distance between the reference imaging device and the target imaging device, wherein
  the plurality of complement images corresponds to a plurality of compliment viewpoints of the subject, and
  the plurality of complement viewpoints is between the reference viewpoint and the target viewpoint;
 determine an interpolation image for each of the plurality complement images based on the distance that is greater than a threshold distance, wherein the interpolation image of each of the plurality of complement images corresponds to a respective viewpoint of the plurality of complement viewpoints along the set virtual path; and
 transmit the reference image, the interpolation image of each of the plurality of complement images, and the target image to a display device.

2. The information processing apparatus according to claim 1, wherein the circuitry is further configured to select the target image based on a display of the target image on the display device.

3. The information processing apparatus according to claim 1, wherein the circuitry is further configured to process the plurality of complement images, the reference image, and the target image based on the virtual path.

4. The information processing apparatus according to claim 2, wherein
the display device includes a main image display region and a selection region, and
the circuitry is further configured to control the display device to display the target image in the selection region.

5. The information processing apparatus according to claim 4, wherein the circuitry is further configured to control the selection region to display the plurality of images corresponding to a plurality of selectable target viewpoints.

6. The information processing apparatus according to claim 4, wherein the circuitry is further configured to control the selection region to display the plurality of complement viewpoints as a plurality of selectable target viewpoints.

7. The information processing apparatus according to claim 6, wherein the circuitry is further configured to receive a selection of one of the plurality of complement viewpoints as the target viewpoint.

8. The information processing apparatus according to claim 1, wherein the circuitry is further configured to generate video data based on the plurality of complement images, the reference image, and the target image.

9. The information processing apparatus according to claim 1, wherein the circuitry is further configured to generate the interpolation image for each of the plurality of compliment images at a time different from a time of capture of the plurality of images.

10. The information processing apparatus according to claim 1, wherein the circuitry is further configured to generate the interpolation image of each of the plurality of complement images based on one of an image-based rendering (IBR) method, a model-based rendering (MBR) method, or a rectification method.

11. The information processing apparatus according to claim 1, wherein the circuitry is further configured to:
determine a respective position of the subject in each of the plurality of images;
select a specific image from the plurality of images captured by the plurality of imaging devices, based on:
a positional relationship between the reference imaging device and the target imaging device, and
the respective position of the subject in each of the plurality of images; and
transmit the specific image with the reference image, the interpolation image of each of the plurality of complement images, and the target image to the display device.

12. The information processing apparatus according to claim 11, wherein the plurality of images is concurrently captured at a plurality of viewpoints.

13. The information processing apparatus according to claim 1, wherein the circuitry is further configured to control the display device to sequentially display the reference image, the interpolation image of each of the plurality of complement images, and the target image.

14. The information processing apparatus according to claim 13, wherein the sequential display is based on the transmission.

15. A method, comprising:
in an information processing apparatus:
selecting a reference image from a plurality of images based on a first user operation, wherein
the reference image is captured by a reference imaging device of a plurality of imaging devices, and
the reference image includes a subject;
selecting a target image from the plurality of images based on a second user operation, wherein
the target image is captured by a target imaging device of the plurality of imaging devices, and
the target image includes the subject;
setting a virtual path from a reference viewpoint associated with the reference image to a target viewpoint associated with the target image;
determining a count of a plurality of complement images based on a distance between the reference imaging device and the target imaging device, wherein
the plurality of complement images corresponds to a plurality of compliment viewpoints of the subject, and
the plurality of complement viewpoints is between the reference viewpoint and the target viewpoint;
determining an interpolation image for each of the plurality of complement images based on the distance that is greater than a threshold distance, wherein the interpolation image of each of the plurality of complement images corresponds to a respective viewpoint of the plurality of complement viewpoints along the set virtual path; and
transmitting the reference image, the interpolation image of each of the plurality of complement images, and the target image to a display device.

16. A non-transitory computer-readable medium having stored thereon computer-executable instructions that, when executed by an information processing apparatus, cause the information processing apparatus to execute operations, the operations comprising:
selecting a reference image from a plurality of images based on a first user operation, wherein
the reference image is captured by a reference imaging device of a plurality of imaging devices, and
the reference image includes a subject;
selecting a target image from the plurality of images based on a second user operation, wherein
the target image is captured by a target imaging device of the plurality of imaging devices, and
the target image includes the subject;
setting a virtual path from a reference viewpoint associated with the reference image to a target viewpoint associated with the target image;
determining a count of a plurality of complement images based on a distance between the reference imaging device and the target imaging device, wherein
the plurality of complement images corresponds to a plurality of compliment viewpoints of the subject, and
the plurality of complement viewpoints is between the reference viewpoint and the target viewpoint;
determining an interpolation image for each of the plurality of complement images based on the distance that is greater than a threshold distance, wherein the interpolation image of each of the plurality of complement images corresponds to a respective viewpoint of the plurality of complement viewpoints along the set virtual path; and
transmitting the reference image, the interpolation image of each of the plurality of complement images, and the target image to a display device.

* * * * *